United States Patent [19]

Alpert et al.

[11] Patent Number: 5,454,086
[45] Date of Patent: Sep. 26, 1995

[54] DYNAMIC PROGRAM ANALYZER FACILITY

[75] Inventors: Alan I. Alpert, Hopewell Junction; Carl E. Clark, Poughkeepsie; Michel H. T. Hack, Peekskill; Casper A. Scalzi, Poughkeepsie; deceased, Richard J. Schmalz, late of Wappingers Falls, by Mary L. Schmalz, administratrix; Bhaskar Sinha, Wappingers Falls, all of N.Y.

[73] Assignee: International Business Machines Corporation, Armonk, N.Y.

[21] Appl. No.: 928,937

[22] Filed: Aug. 11, 1992

[51] Int. Cl.⁶ .............................. G06F 9/00; G06F 11/00
[52] U.S. Cl. .................. 395/375; 395/700; 395/183.11; 395/183.12; 395/183.14; 364/264; 364/265.6; 364/267.8; 364/285; 364/DIG. 1
[58] Field of Search ................................ 395/375, 575; 371/19

[56] References Cited

U.S. PATENT DOCUMENTS

| | | | |
|---|---|---|---|
| 4,831,517 | 5/1989 | Crouse et al. | 395/375 |
| 4,937,740 | 6/1990 | Agarawal et al. | 395/575 |
| 5,265,254 | 11/1993 | Blasciak et al. | 395/700 |

*Primary Examiner*—Kevin J. Teska
*Assistant Examiner*—Azni Mohamed
*Attorney, Agent, or Firm*—Bernard M. Goldman

[57] ABSTRACT

Provides a dynamic execution link between an analyzer program and each hook instruction in a program. Special types of hook instructions are provided for use in a hooked program. The link causes the analyzer program to execute as part of a continuous uninterrupted execution for each hook instruction. The link uses hardware and/or internal code to access a hook control area which provides linkage information needed to invoke the execution of the analyzer program upon completion of the hook instruction and to continue the execution of the hooked program following the completion of the analyzer program. The linkage information includes the entry location into the analyzer program, and also locates the first hook work area (HWA) of a sequence of HWAs, from which an HWA is assigned to each current hook instruction. The assigned HWA stores a return point location in the hooked program at an instruction following the current hook instruction. One or more hooked programs may concurrently use the same analyzer program. As soon as execution by the analyzer program ends for a hook instruction, its assigned HWA is released for use by another hook instruction.

41 Claims, 10 Drawing Sheets

PSW | KEY | AS | CC | PM | A | IA |

DYNAMIC PROGRAM ANALYZER FACILITY

INTRODUCTION

The invention relates to methods and means for efficiently gathering and generating statistical, state and/or debugging information for one or more programs while they are being executed.

PRIOR ART

The S/370 Monitor Call (MC) instruction (and other hook instructions) have been described in the prior art for use in the gathering of statistical and state information about executing hooked programs. The S/370 Monitor Call instruction is described in a prior publication entitled "Enterprise System Architecture/390" (form number SA22-7201-00) on pages 7–33 and 7–34. A program interruption is caused when a monitor call instruction is executed and a corresponding monitor-mask bit in control register 8 is set to one. When the monitor-mask bit is zero, no interruption occurs for the MC instruction which then executes as a no-operation. Bits 12–15 in the MC instruction (called the I2 field) contain a number specifying one of 16 monitoring classes. When the monitor-mask bit corresponding to the class is set to one, a monitor-event program interruption occurs. The first operand in the MC instruction in its field B1,D1 is not an address, but it forms a monitor code which is stored in system memory word location 156 to enable unique identification for each MC instruction in a program.

A "hooked program" is defined herein as any program containing hook instructions, of which the prior MC instruction is an example. Enabled hook instructions are executed within the hooked program containing them to analyze program characteristics, gather execution statistics about the program, monitor program states, and detect other conditions existing during execution of the program such as detecting branch addresses, processor states, the contents of general registers, the location of a program or data in system memory, recording the time of execution or the frequency of execution of a hook instruction, etc. The gathering of time, state, characteristic and location information at selected execution points in a program is useful for debugging the executing program and determining the efficiency of program operation.

Each enabled MC instruction passes control of the processor from its hooked program to operating system (OS) software by generating an interruption signal that causes OS to terminate a current dispatch of the hooked program. The OS may then invoke an analyzing program (monitoring program) to analyze the system and processor states existing for the hooked program in relation to the interrupting MC instruction. After the analyzing program executes, OS may then re-dispatch the hooked program to continue its execution after the MC instruction. The interruption saves the hooked program's state, which is restored by the OS after all processing for the interruption is completed.

The interruptions and redispatchings of the hooked program (by the enabled MC instruction type of hooks) severely degrade the performance of the hooked program. Programs containing such types of hooks are generally executed only in a test environment, where severe degradation to the program performance is permitted for the relatively short period of time of a test operation. The subject invention avoids program interruptions and OS intervention for redispatching due to the hook instruction, whether enabled or disabled.

For a hooked program containing MC instructions, the OS may set off all mask bits to disable all MC instructions in the hooked program, which allows it to execute without the interruption overhead caused by the MC instructions, or OS may selectively enable some and disable other mask bits to selectively enable some of the MC instructions to pass control to an OS controlled analyzing program.

A prior analyzing program is the IBM Inspect program having documentation entitled "Inspect for C/370 and PL/1—Using INSPECT Under MVS" published by IBM under form number SC26-4530-0. The Inspect program is used for analyzing and debugging C/370 and PL/1 programs. Among other operations, Inspect is invoked by means of the S/390 Monitor Call (MC) instruction when it is inserted and enabled as a hook instruction at selected points in a hooked program (which is the program being analyzed by the Inspect program) to generate analysis and debugging information about the hooked program.

Other prior art in this area include embedded calls, overlay traps, and monitor instructions to achieve similar analyzing capability.

Embedded calls are used as subroutine linkages. These are only possible at predetermined points, and the calling sequence disturbs part of the state of the program being analyzed. Execution overhead is minimum, but, typically, no increase in privilege is possible.

Overlay traps like monitor call (MC) and supervisor call (SVC) instructions cause interruption overhead, requiring the control program to capture and restore the state of the program being analyzed. This involves large execution overhead, but little or no state disturbance. Privileged switching from the program being analyzed to an analyzer program is done only through involvement of the control program (operating system).

Conventional monitoring instructions cause conditional traps which avoid system overhead when masks are set to disable execution of the analyzer program. When masks are set to enable execution of the analyzer program, control program interruptions result which cause the large execution overhead.

SUMMARY OF THE INVENTION

The invention provides a dynamic execution link between a uniquely controlled hook instruction and an analyzer program. The novel dynamic execution link eliminates OS involvement for the hook operation, and eliminates the interruptions previously used to link OS to the hook instruction execution. Accordingly, the dynamic execution linkage of this invention provides a non-interrupting connection from each enabled hook instruction in a hooked program to an analyzer program, and from the analyzer program back to the hooked program.

The dynamic execution linkage of this invention can greatly increase the efficiency of operation of analyzer programs. The uninterrupted invocation of an analyzer program by this invention can more efficiently gather information about the hooked program when used for program analyzing, program auditing, program tracing, debugging the hooked program, etc.

The novel execution linkage provided by this invention enables the analyzer program to dynamically receive control from, and to dynamically return control to, the hooked program (the program being analyzed) in a manner that does not disturb the entire state of the hooked program. This invention's process of dynamically transferring control from a hooked program (being analyzed) to an analyzer program without interrupting either the hooked or analyzer program is herein called "non-interruption hooking", in contra-distinction to the "interruption hooking" in the prior art.

This invention also eliminates dispatchings and redispatchings by the operating system resulting from the program interruptions by hook instructions, which contributes to the significant improvement in the execution efficiency of enabled hooked programs and analyzer programs.

This invention appends the execution of an analyzer program to the execution of each enabled hook instruction without involving an interruption to the hooked program execution. On the other hand, the execution of each prior art monitor call (MC) instruction interrupted the hooked program, causing the operating system (OS) software to then undispatch the hooked program and dispatch the analyzer program. After execution of the analyzer program, it accessed the OS which undispatched the analyzer program and dispatched the hooked program to continue its execution after the MC instruction. Each MC instruction interruption and its resulting undispatchings and dispatchings introduced OS overhead, which is eliminated by this invention.

The novel non-interrupting linkage provided by this invention includes integrity checks which protect against problems occurring with ordinary program linkages.

The non-interrupting linkage of this invention includes authorization and status-storing controls built directly into the processor execution controls, which do NOT involve the OS. This invention provides for the continuous and smooth execution transition in both directions between each of this invention's enabled hook instructions in a hooked program and an analyzer program. System integrity is preserved by controls built directly into the processor. Having these controls built directly into the processor provides a major performance advantage of the non-interrupting linkage provided by this invention over the prior interrupting linkage between hook instructions and an analyzer program.

The invention allows simultaneous execution of any number of hooked programs being analyzed by multiple processors using any number of analyzer programs, or the same analyzer program in a common system memory. This includes programs executing under multiple dispatchable units or under a single dispatchable unit with subspaces.

In more detail, the invention provides different types of hook instructions. One type has an instruction operand that can specify any of a large number of hook numbers. In a hooked program, none or any one or more of the hook numbers can be enabled (or disabled) in a processor mask field when executing this type of hook instruction. The analyzer program executed by this type of hook instruction may directly set, reset or change the mask field settings for the hook instructions without having to call on an OS service to do it. Thus whenever the analyzer program is given control of the processor, it can have direct control over which hook instruction type numbers are enabled, and which are disabled. For example, a programmer at a terminal can communicate with the analyzer program to control mask changes for specified hook numbers.

Another type of hook instruction provided by this invention operates without a mask. This maskless hook instruction needs only an operation code, and hence, the instruction length is reduced. It does not have the capability of specifying hook numbers. Its intended use is for monitoring a program which was not originally designed to contain hooks, and hooks are contemplated at a later time, or in a program with hooks but in a location not previously planned to have one. These small (2-byte) hook instructions are inserted into a program by overlaying code in the program, and are inserted only at required monitoring points where they are expected to always be enabled. Like the invention's maskable type of hook instructions, its maskless type of hook instructions also do not use or call any OS service. Since the insertion of hooks by overlaying existing code may cause problems in execution of the hooked program, this invention provides more stringent execution criteria for its maskless hook instructions than for its mask type hook instructions.

The elimination of interruptions and redispatchings by this invention allow minimal disturbance to the operating states in the hooked program. Minimal state disturbance is critical to the accuracy of the monitoring operation, particularly when hook instructions are placed at a large number of places in the hooked program, in order to determine precisely what execution states exist at those places.

The non-interrupting linkage of this invention provides a defined, controlled, but direct branching mechanism which employs dynamically assigned Hook-Work-Areas (HWAs), which are preferably pre-allocated for use in the operation of this invention. These should be pre-allocated to obtain the best performance. Pre-allocated HWA's will still be dynamically assigned as required in the execution of hook instructions.

In addition, the invention supports storage protection for the analyzer program against modifying accesses by an executing hooked program (that would change the analyzer program). The invention provides controls that give the analyzer program access to any hooked program, while removing (or decreasing) the capability of the hooked program to access the analyzer program.

Further, the invention allows asynchronous entry into the analyzer program (comprised of read-only code) by a plurality of hooked programs separately executing on different processors and/or on the same processor. The analyzer program must be recursive if it allows any number of hook instructions to be simultaneously executing it. Each hook instruction executes the analyzer program from its entry point to an ending hook return instruction. Thus at any point in time, the analyzer program may be executing for several different hook instructions, for which each execution may, at the same moment, be at a different instruction in the analyzer program. Each such execution is associated with a separate, unique work area.

All concurrently executing hooked programs, the analyzer program, and the hook work areas are preferably located in the same address space to enable addressability among them. Different hooked programs may be concurrently executing on different processors in a multiprocessor system operating with multi-processing, or on the same processor operating with multi-programming.

However, the analyzer program can also support hooked programs executing in multiple virtual address spaces. This cross-memory support of hooked programs is accomplished by placing the HWAs, for the hook instructions, in the same address space as the hooked program itself. Using the hook with mask instruction, programs executing in multiple virtual address spaces can selectively choose those virtual address spaces for which debugging will be performed.

When a plurality of hooked programs are simultaneously running on a plurality of different processors, the General-purpose Registers (GRs) in the respective processors keep track of each instance of execution of the analyzer program and its currently associated HWA for a respective hook instruction. These GRs in any number of respective processors maintain the associations required to obtain the recursive operation of the analyzer program for any number of simultaneously executing hook instructions in different hooked programs executing on the different processors.

Thus, the invention preferably utilizes four types of items within a computer system, which are:

1. One or more hooked programs, each containing one or more special type(s) of hook instructions provided by this invention, and the hooked programs may execute concurrently.

2. An analyzer program that monitors or analyzes an aspect of the hooked program for each hook instruction executed in the hooked program. (A hook instruction is considered to be "in execution" while the analyzer program is executing for the respective hook instruction).

3. A sequence of hook work areas (HWAs). An HWA is assigned to an "instance of execution" of an enabled hook instruction and receives existing state information of the hooked program at the time of the "instance" with which it is associated.

4. A hook control area for providing linkage information needed to provide controls for execution of the analyzer program after a hook instruction without requiring a processor interruption, and the continuation of execution of the hooked program at the end of execution of the analyzer program.

The HWAs are chained together, and the first HWA of the chain is addressed from the hook control area for locating an HWA for assignment to the current hook instruction being executed in a hooked program. A hook-in-process flag is provided in each HWA as an HWA lock field. An HWA assignment is made to the current hook instruction by searching through the chain of HWAs for the first HWA having its hook-in-process flag in an unlocked state. The hook-in-process flag is then immediately set to a locked state to indicate the HWA is assigned and unavailable to any other hook instruction. The locked state remains as long as the analyzer program has not ended execution for the associated hook instruction. As soon as execution by the analyzer program ends for the associated hook instruction and the content of the HWA has been used to prepare for the return to the hooked program, the hook-in-process flag is set to its unlocked state to indicate that the particular HWA is again available for selection and use by another hook instruction execution.

Accordingly, a plurality of HWAs in the chain may be simultaneously in the locked state for a plurality of simultaneously executing hook instructions in a plurality of different or same hooked programs. This may happen because a program has established an asynchronous exit within the operating system, or because of multitasking in a multi-processing system. The information put into the HWA by execution of a hook instruction is used by the analyzer program for analyzing, generating and recording information for the associated hook instruction execution.

The invention uses hardware and/or micro-code (HDW/MCD) accessed through interpretation of the operation code of the hook instruction currently being executed by a hooked program. Micro-code is sometimes called "internal code" in a computer system. This hardware and/or micro-code generally uses a memory area or registers not explicitly addressable by any hooked program.

For each execution of a hook instruction, the system hook controls provide an implicit branch address to an entry point in the analyzer program (the hook instruction does not contain any branch address operand). In the processor executing the hook instruction, this implicit branch address is loaded into a general register (e.g. GR15) from a processor control area as part of the interpretation of the operation code of the hook instruction. The original content of the GR used for the implicit branch address is stored in the HWA first.

Hook instruction execution also includes the loading of the HWA address for the instruction into another implicitly addressed GR (e.g. GR4) in the processor when an HWA is found and assigned. Before the GR is loaded with the HWA address, its content is stored in the HWA, so that it can be restored to its original content when returning to the hooked program. Furthermore, the hook instruction execution also implicitly accesses the program-status-word (PSW) existing in the processor when a hook instruction is executing, and it stores the PSW in the associated HWA assigned to the current hook instruction. The stored PSW contains the address of the instruction following the current hook instruction in the hooked program to enable a return to the hooked program from the analyzer program.

The PSW state for the hooked program is reset by the analyzer program executing a hook return instruction as its means of returning from the analyzer program to the hooked program execution.

The analyzer program executes from its entry point to its logical completion for each executing hook instruction. The end of the analyzer program is provided with a unique hook return instruction that provides the necessary controls for a return of processor control to the hooked program for which the analyzer program has been executing. The hook return instruction switches processor control from the analyzer program to the next instruction in the hooked program (which is the instruction following its last executed hook instruction addressed by the HWA stored PSW). This address switch is done by hardware and/or micro-code invoked by interpretation of the operation code of the hook return instruction.

The types of information generated by the analyzer program (and its corresponding code) may be any of well-known types of information provided by hook instructions used in the prior art. The processor may store any information into areas of memory for later use for monitoring, analysis, etc.

Execution by this invention of its hook instructions is not affected by normal but arbitrary OS undispatching within either the hooked program or the analyzer program. Undispatching is the OS ending of a dispatch within the hooked program or within the analyzer program normally caused by an asynchronous exit from either program to the operating system and then dispatching the processor to another program (which may not be either the hooked program or the analyzer program). This may occur as the result of an event not directly related to the hook-caused execution of an analyzer program, e.g., an I/O or timer interruption followed by dispatch of a higher-priority program. Eventually, the OS will redispatch the undispatched program. Such asynchronous events do not affect the operation of either the hooked program or the analyzer program. The program redispatching may be on the same, or on another processor, which enables any selected processor to pick up execution at whatever point the program left its execution at the time of the asynchronous interruption.

Such asynchronous dispatching does not affect the integrity of data collected by the operation of the analyzer program in all instances of its concurrent execution for plural hook instructions by simultaneously executing processors. The analyzer program (comprised of read-only code) can be executing recursively (simultaneously) and asynchronously by invocation for any number of hooked programs. Thus, this invention allows the analyzer program and each hooked program to be interrupted at any time by events having nothing to do with the execution of its hook instructions or its analyzing program, without affecting the integrity of data being generated by the analyzer program for the hook instructions. Such unrelated interruptions may for example occur for I/O, external events, timer and other interruptions. Thus, at any time, the analyzer program can be asynchronously executing for any number of currently executing hooked programs without requiring coordination among the hooked programs. The invention provides a separate HWA for each such concurrent hook execution.

Dispatching interruptions to any processor executing the analyzer program or any hooked program are handled by the operating system (OS) in the same manner as it handles interruption for any other program. Upon any interruption, the OS stores the return location and program state for continuing execution of the interrupted program in its own separate storage as soon as the associated interruption is cleared. An important fact here is that the hook instruction itself does not cause any interruption to any processor operation.

The analyzer program, the control area, and the work areas (HWAs) receiving hook information are preferably isolated from the hooked programs being executed to protect the former from stores by the latter. The invention supports such isolation by not requiring the hooked program or its hook instructions to have explicit addressability to the analyzer program, or to the control area, or to the work areas (HWAs). In S/390 systems, the analyzer may be assigned a storage key not assigned to the hooked program to protect it and the HWAs. As specified by the system controls, the storage access key may change during hook and hook return instructions in S/390 systems in order to provide protection for the analyzer, the hook control area, and the HWAs.

The hooked programs may be isolated by assigning them the Public Storage Key (PSK) of U.S. patent application Ser. No. 07/710,875 now U.S. Pat. No. 5,163,096, filed Jun. 6, 1991, while the analyzer program, the HWAs and the control area are run under one or more non-PSKs, all being in the same address space. Furthermore, the hooked programs may be run in different virtual address subspaces under the PSK in this environment, using the sub-spaces invention of U.S. patent application Ser. No. 07/847,521 now U.S. Pat. No. 5,361,356, filed Mar. 6, 1992. In the latter case, the implicitly specified HWA that is used is in the same subspace as the hooked program. Additionally, in the subspace environment, different analyzer programs can be invoked for different subspaces of the same base space. However, the subject invention does not require the PSK or subspace environments when the hooked applications, the analyzer program, the HWAs and the control area are operated as specified by this invention.

Each "instance" of execution of a hook instruction is assigned a unique HWA in which the analyzer program stores its gathered information for that execution of the hook instruction. A different HWA may be assigned each time the same hook instruction is executed, and the stored states in an HWA may be different for each different execution of the same hook instruction.

DETAILED DESCRIPTION OF EMBODIMENTS OF THE INVENTION

General Operation of the Detailed Embodiments

Figure 1:
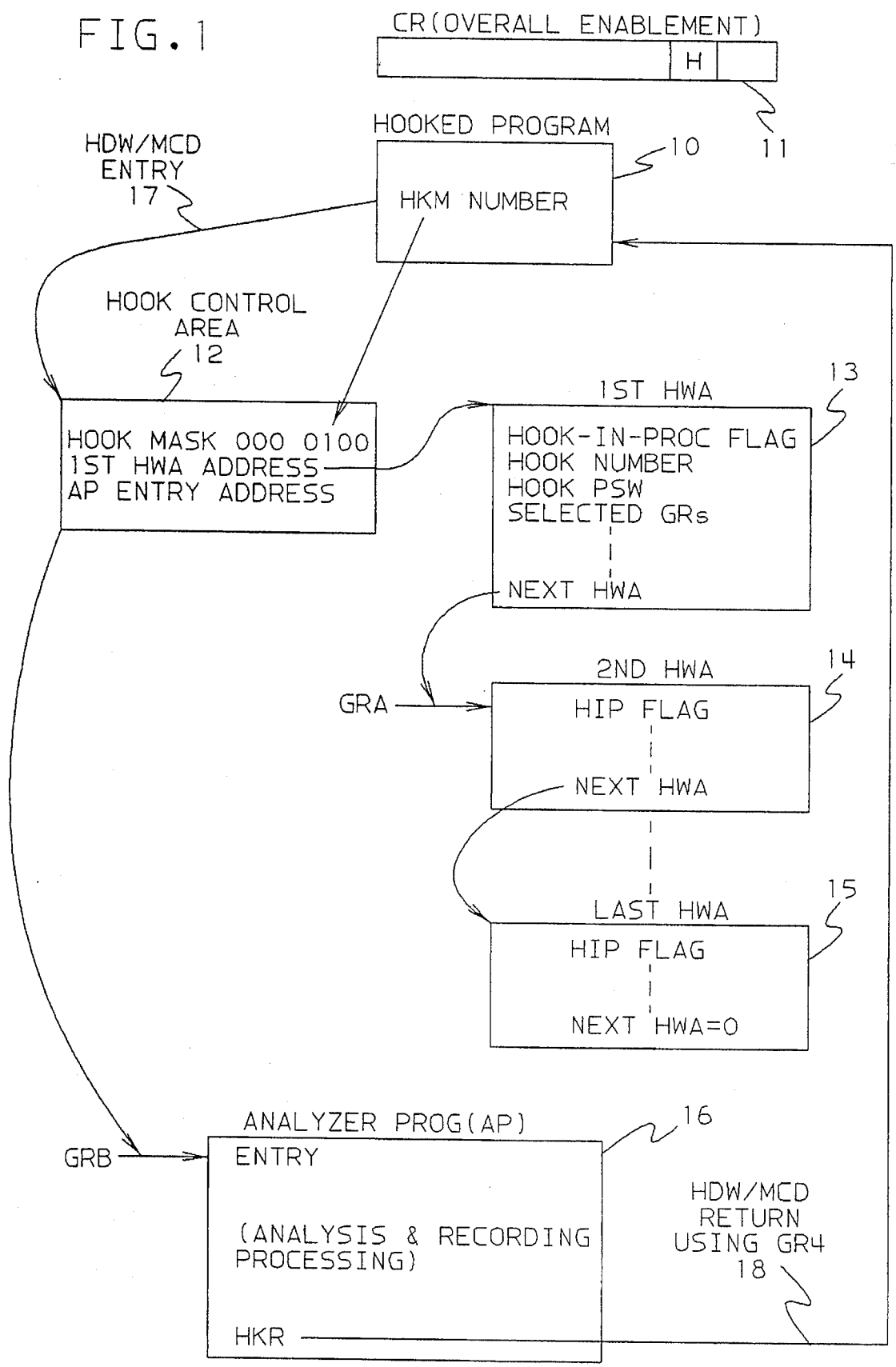
FIG. 1 is a block diagram of a general embodiment of the invention.

The preferred embodiment of the invention provides the hook instructions in the environment of the ESA/390 architecture as a hook mask (HKM) instruction and a hook unmask (HKU) instruction. The HKM and HKU instructions operate similarly, but they are generally designed to be inserted differently in hooked programs. The HKM instruction is provided for use in programs originally designed to contain hooks, in which HKM instructions are inserted into such a program before it is compiled and tested. This characteristic enables the definition of HKM with any instruction format and instruction length. HKM instructions are compiled in and remain in the program, they are executed as no-operations if hooking is not enabled, and they can be made effective anytime by enabling the hook controls. These characteristics enable the use of this instruction to periodically observe the performance of a subsystem under different workloads, or to gather statistics under different operating environments for specific time periods. HKU instruction has its preferred use in programs originally designed without hook instructions, in which HKU instructions are inserted after the program has been compiled by overlaying an existing instruction in the program.

HKU is used as a dynamic temporary overlay of an existing instruction during a debugging session. Thus, the format must be chosen such that the size of HKU instruction does not exceed that of the smallest instruction that may be overlaid by HKU. Execution of HKU is unconditional and hence not suited for production environments. This is a tool for dynamic debugging or observation of a program in a test environment. Since HKUs overlay other instructions in the program, they are not meant to stay in the program in a production environment.

Special system enablement controls are provided for this invention, including overall enablement control of the analyzing operation in a single control location, such as in a control register. The overall control may be made to apply to all types of hook instructions provided by this invention, such as the HKM and HKU instructions, or an overall mask control may be made to apply only to the HKM type of instruction. For example, an overall mask control may be made to not apply to the HKU instruction when it is assumed that the HKU instruction is always to be executed when it is inserted in any program, so that a control to mask it off is not needed.

The hook under mask (HKM) instruction provides a mask number with each instruction that allows the execution of the HKM instructions in any hooked program to be controlled by their mask number. The HKU (hook unmask) instruction does not have any mask number, and is correspondingly smaller in size to take up less space in a hooked program. Its smaller size makes it more adaptable to overlaying code in an existing program than the HKM instruction, since only a single instruction is necessarily overlayed by HKU.

The user selects the mask number (name) to be used in each HKM instruction, which is an operand in the instruction having the form of an address, but which is interpreted as a mask name and not as an address. The user's choice of different mask names allow the user to distinguish different HKM instructions placed at different points in the same hooked program. When a HKM instruction is executed, the mask name is used as an index into a mask field located in the implicit control area. If the indexed mask bit is in a mask enabled state, the instruction is enabled and the mask number is stored in the HWA of the current instance of the instruction. If the indexed mask bit is in a mask disabled state, the instruction is disabled and it is handled as if it is non-existent and is treated as a no-operation (no-op). No-op performance is minimal and is an important aspect of this disclosure.

Another level of masking control may be provided as a class enablement mask in the hook control area. Such class enablement indicates which of plural subsets of mask bits are enabled for use by the hook mask names. Thus if the mask name in a hook instruction indexes into a disabled class of mask bits, the hook instruction is disabled and executes as a no operation (no-op), regardless of the state setting of the index-specified mask bit.

The mask enablement controls apply only to the HKM instruction type but controls other than the overall mask enablement controls apply to both the HKM and HKU instruction types.

When a HKU instruction is executed, it has no mask name, and the mask field in the control area is not accessed. Hence, no hook name is put into the HWA for the execution of any HKU instruction. However, an associated field in the HWA indicates that a HKU is being executed and that the mask name field is not used. Identification of a HKU instruction is necessary for ensuring that the overlaid instruction be executed by the analyzer prior to returning (via HKR) to the hooked program.

Preferred Embodiment in FIG. 1

FIG. 1 represents a general embodiment of the subject invention for a new hook instruction herein called a "hook under mask" (HKM) instruction. The HKM instruction is shown within a hooked program 10, in which it was inserted when this program was compiled or assembled to obtain state information at this point in the execution of hooked program 10. Hooked program 10 may be any type of program, such as an application program, a system control program, a program that executes in problem state or in supervisory state, etc.

An overall enablement control over the execution of the hook instructions in program 10 is provided by a field H in a control register 11. Each processor in a multi-processor environment has its own control register (11). If bit H is set to its enablement state it enables HKM instructions to execute in program 10. If bit H is set to its disablement state, the HKM instructions in program 10 are not executed while program 10 is executed, in which case the HKM instruction is handled as a no-op (program execution goes to the instruction following the HKM instruction whenever an HKM operation code is detected). The remaining parts in FIG. 1 are used only if the HKM instruction is enabled, i.e., only during the execution of an active HKM instruction.

If enabled, the execution of an HKM instruction accesses its operand, which may be in the form of address components (such as the base and displacement form used in the IBM S/370 architecture, which are added to generate the operand address, B+D=Address). In the latter case, the generated address is not handled as an address, but is handled as an index, herein called a hook mask number, for accessing a particular mask bit in a hook mask.

Hardware and/or micro-code (HDW/MCD) in the instruction unit of a processor executing the hooked program 10 interprets the operation code of each instruction currently being executed by a hooked program. (Micro-code is often called "internal code" in IBM computer systems.) This hardware and/or micro-code accesses a system hook control area 12 which is a memory area or register(s) not explicitly addressable by any instructions that could be used by the hooked program. This information is initialized by the control program and is specific for a particular unit of execution, like a program or task, or an address space containing a program or task. The interpretation of the HKM instruction performs several operations, of which a controlling operation is to use the newly generated hook mask number of the HKM instruction as an implicit address that accesses a mask bit in the hook mask at the generated index value. If the mask bit is set to its enabled state, the execution of this HKM instruction proceeds, but if the mask bit is set to its disabled state, the execution of this HKM instruction aborts, reverting to a no-op, and the hooked program execution goes to its next instruction. The following description is applicable only if the HKM instruction is enabled.

If the HKM instruction is enabled, the next operation of the hardware/micro-code controls is to initiate a process of finding an available HWA and assigning it to the current HKM instruction during a search of a chain of HWAs. The availability of an HWA is indicated by the state of a hook-in-process flag in each HWA in the chain; each hook-in-process flag has either an unlocked state or a locked state. During the search, the first HWA found to have an unlocked state is assigned to the current HKM instruction. The selected HWA is immediately set to a locked state, with the act of setting it locked serialized across all CPUs, to indicate its assignment to an HKM instruction, so that it will not be used by any other HKM instruction execution until the HWA is set to an unlocked state after the execution of analyzer program for the current HKM instruction is completed.

Figures 3, 4:
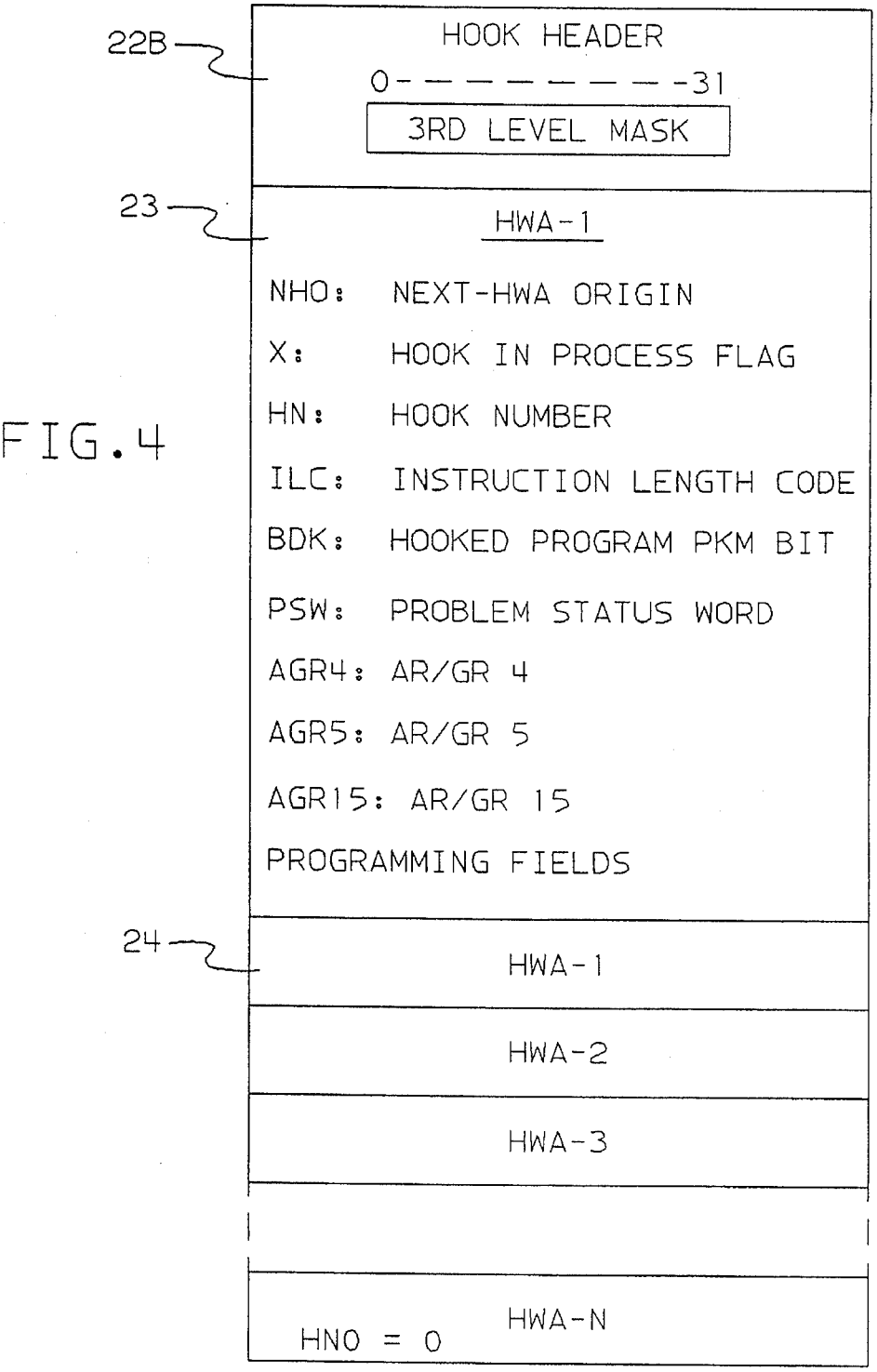
FIG. 3 represents pertinent fields in a program status word (PSW) used by the embodiment in FIG. 2.
FIG. 4 represents a hook header and hook work area (HWA) used by the embodiment in FIG. 2.

Next, the hardware/micro-code controls implicitly access the program status word (PSW) existing in the processor which is executing the current HKM hook instruction, and store the hooked-program PSW, which is shown for this embodiment in FIG. 3, in the associated HWA assigned to the current hook instruction. The hardware/micro-code controls also store the contents of general registers as they were in the hooked-program processor before any of its general registers are loaded from the hook control area 12. The PSW contains the address of the next instruction, which follows the currently executing HKM instruction in the hooked program.

Then, parameters in the hook control area are accessed and loaded by the hardware/micro-code controls into some of the general registers in the processor. This includes loading into a general register A (GRA) the address of the HWA newly assigned to the current HKM instruction. And an analyzer program (AP) entry address in area 12 is loaded into the PSW of the processor executing the hooked program to initiate its execution of the analyzer program 16 for the current HKM instruction. The AP entry address in area 12 is also loaded into a general register B in the processor executing the analyzer program to provide it with a base address for its operations. The AP entry address is the AP entry address into the analyzer program at which instruction execution is started for the analyzer program. Note that the hook instruction does not contain any explicit branch address operand, but operates as a branch to an implicit address specified in the hook control area.

The analyzer program (AP) 16 analyzes the PSW and hooked program state information put into the assigned HWA, and may examine the data and program areas of the hooked program, and may generate further information from them, and may record any of its information in a memory area not shown in FIG. 1. The format of an HWA area and of an individual HWA for this embodiment is shown in FIG. 4. The types of information generated by the analyzer program may be any of well-known types of information provided by hook instructions used in the prior art. The HWA contains available space allowing the analyzer to place addresses to storage locations containing the additional information for each instance of hook execution.

The hook instruction is considered to be "active" while the analyzer program is executing for the respective hook instruction; and the execution of each enabled hook instruction in a hooked program may be considered an extension of execution of the associated hooked program. The locked state for the associated HWA remains as long as the analyzer program has not ended execution for the associated hook instruction execution, i.e. while the hook instruction is "active". The hook instruction becomes "inactive" once the associated (matching) HKR operation completes.

The analyzer program executes from its entry point address to its end for each executing hook instruction. The end of the analyzer program is provided with a unique hook return (HKR) instruction that, when executed, provides addressability for a return of processor control from the analyzer program back to the hooked program which contains the HKM instruction for which the analyzer program is ending execution. The HKR instruction switches processor control to the next instruction in the hooked program (which is the instruction following the hook instruction for which the analyzer program had just executed). This switch in addresses is done by hardware and/or micro-code invoked by interpretation of the operation code of the HKR instruction, which implicitly loads the PSW (currently stored in the associated HWA) into the processor to switch its execution to the next instruction address in the hooked program. Not all PSW fields are loaded. Before the PSW is loaded, the stored GRs are restored to their state at the time of hook instruction execution.

Also the execution of the HKR instruction sets the hook-in-process flag in the associated HWA to its unlocked state to indicate this HWA is again available for assignment to another hook instruction. HKR need not serialize the unlocking of the HWA with other CPUs.

An "instance of execution" for a respective hook instruction is obtained for each execution of any hook instruction. Accordingly, a different "instance of execution" is obtained for each separate execution of the same hook instruction, such as while a hooked program is looping or is called a number of times by tasks executing concurrently in a multiprocessing environment. An assignment of an HWA is for one instance of execution (an instance).

Different hooked programs may be concurrently executing on different processors in a multiprocessor system operating with multi-programming. A plurality of HWAs in the HWA chain may be simultaneously in a locked state, respectively representing a plurality of simultaneously executing hook instructions on different processors or concurrent tasks for a corresponding plurality of different and/or same hooked programs.

The information put into the respective HWAs for concurrently-executing hook instructions is associated with different recursive executions of the analyzer program, using a different HWA for each such execution, for which each respective execution is being controlled by a respective processor executing a different hook instruction, although some or all of these instructions may be of the same type, e.g. they all might be HKM or HKU instructions or a mix of HKM and HKU instructions.

Thus, the recursiveness of the analyzer program allows it to execute any number of hook instructions concurrently on multiple processors, and to provide correct execution regardless of a control program's dispatching decisions on one or more processors. A successful execution of a hook instruction causes the analyzer program to execute from its entry point to its ending hook return instruction. Hence at any point in time, the analyzer program may be executing for several different hook instructions, for which each execution may, at the same moment, be at a different instruction in the analyzer program. This requires the analyzer program to be re-entrant, separate work areas to be used for each instance of hook execution. The assignment of HWA as part of the hook execution facilitates this.

Accordingly, this invention enables smooth non-interrupting control switching between the executions of analyzer program 16 and any executing hooked program 10 (of which only one hooked program 10 is shown in FIG. 1), without any program interruptions and redispatchings occurring during the switchings between the hooked program and the analyzer program, or between the analyzer program and the hooked program for any of the hook instructions provided by this invention.

The smooth switchings are obtained by hardware/micro-code accessing the hook control area 12, assigning the HWA, storing GR contents of the processor executing the hooked program in the assigned HWA, loading GR A with the HWA address and loading GR B with the address of the analyzer program entry point at which its execution is initiated, and at the end of execution of the analyzer program returning to the next instruction in the hooked program. These GRs in any number of processors, whose content for each execution is obtained from a specific HWA, maintain the associations of all these processors with the recursive operation of the analyzer program for any number of simultaneously executing hook instructions in different hooked programs executing on different processors.

Also, this invention allows its hooked programs and its analyzer program to be interrupted at any time by interruptions not caused by its hook instructions without affecting the integrity of data collected by the operation of the analyzer program in all instances of its concurrent execution for plural hook instructions by simultaneously executing processors. The analyzer program (comprised of read-only code) is executed recursively (simultaneously) and asynchronously by any number of hooked programs. These interrupting events are unrelated to the execution of the hook instructions and its analyzing program, and do not affect the integrity of data being generated by the analyzer program for the hook instructions in the hooked programs. Such unrelated interruptions may for example be caused by I/O, external events, timer and other signals. No special coordination is provided or needed by this invention among the hooked programs asynchronously executing at the same time.

Interruptions to the analyzer program, or to any hooked program, are handled by the operating system (OS) in the same manner as it handles interruptions of other types of programs. For any unrelated interruption, the OS stores the return location at which execution is to be continued for an interrupted program as soon as the associated interruption is cleared. An important fact here is that the hook instruction, itself, does not cause any interruption to any processor operation.

A program dispatch may end on any processor at any time after any instruction in any program, including after any instruction in any hooked program, or anywhere in the analyzer program (before its has reached its end for a current hook instruction). And that program may be redispatched on the same, or on a different processor, which then loads its corresponding GRs for the new dispatch to enable the processor to pick up execution at whatever point the program left its execution at the end of its last dispatch. The operating system software stores and restores the state of each processor at the beginning and end of any dispatch in the conventional manner without any problem caused to the integrity of the data being analyzed and generated for any hook instruction.

Further, this invention allows its hooked programs and its analyzer program to be operated in any processor state (including problem state, as well as supervisory state).

The set of concurrently executing hooked programs that are controlled by one hook header that use the HWAs in the HWA chain associated with that hook header, and that are to invoke a single version of an analyzer program, are all in a single address space to enable addressability among them. However, the analyzer program, the control area, and the work areas (HWAs) receiving hook information are preferably isolated from the hooked programs being executed to protect the former from wild stores by the latter. The invention supports such isolation by not requiring the hooked program or its hook instructions to have explicit addressability to the analyzer program, or to the control area, or to the work areas (HWAs).

The hooked programs may be isolated by assigning them the Public Storage Key (PSK) of U.S. patent application Ser. No. 07/710,875 (P09-91-016), while the analyzer program, the HWAs and the control area are run under one or more non-PSKs, all being in the same address space. Furthermore, the hooked programs may be run under a program storage key (PSK) in different subspaces of the sub-spaces invention in U.S. patent application Ser. No. 07/847,521 (P09-91-002). To be used in the subspace environment, each subspace contains its own hook header and its own chain of HWAs used for analyzer invocations (through execution of hook instructions) in that subspace. A single re-entrant analyzer program may be used to service the invocation of all subspaces of a subspace group. However, the subject invention does not require the PSK or subspace environments when the hooked applications, the analyzer program, the HWAs and the control area are operated as specified by this invention.

Figure 2:
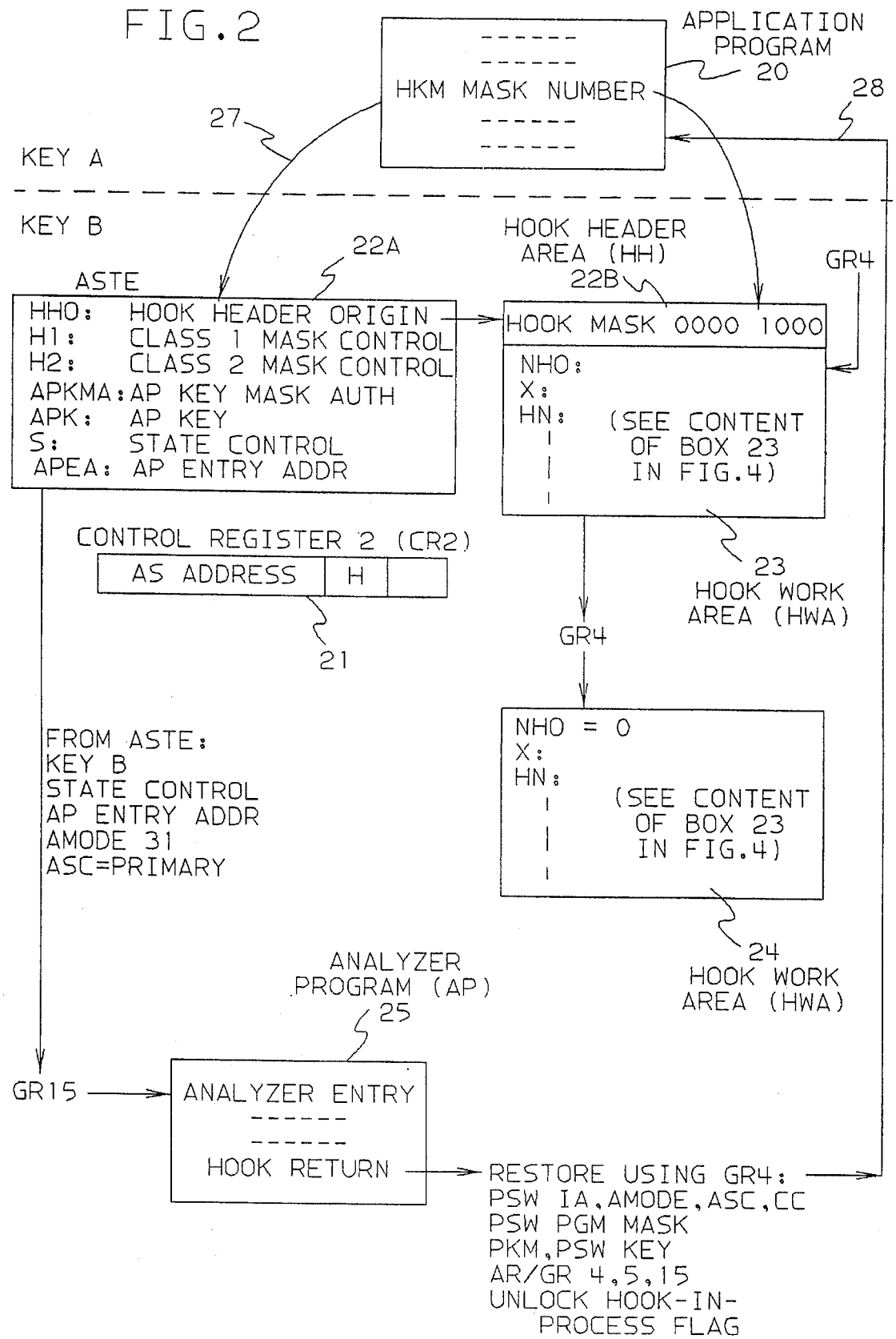
FIG. 2 is a block diagram of a more detailed embodiment of the invention.

Specific Embodiment in FIG. 2

Figure 5:
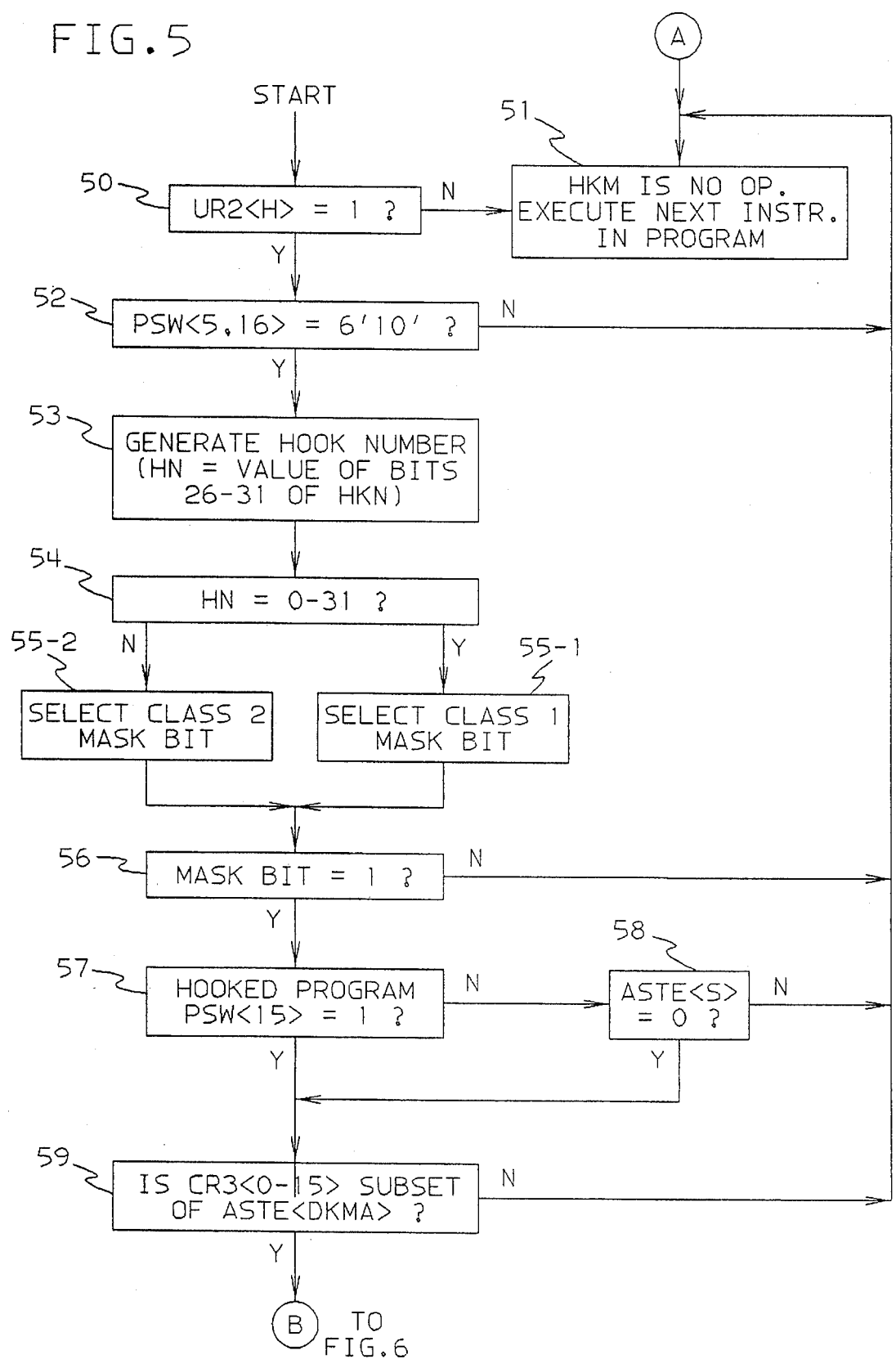
FIGS. 5, 6 and 7 represent a flow diagram of a process used by the hook under mask (HKM) instruction for the embodiment in FIG. 2.
Figure 6:
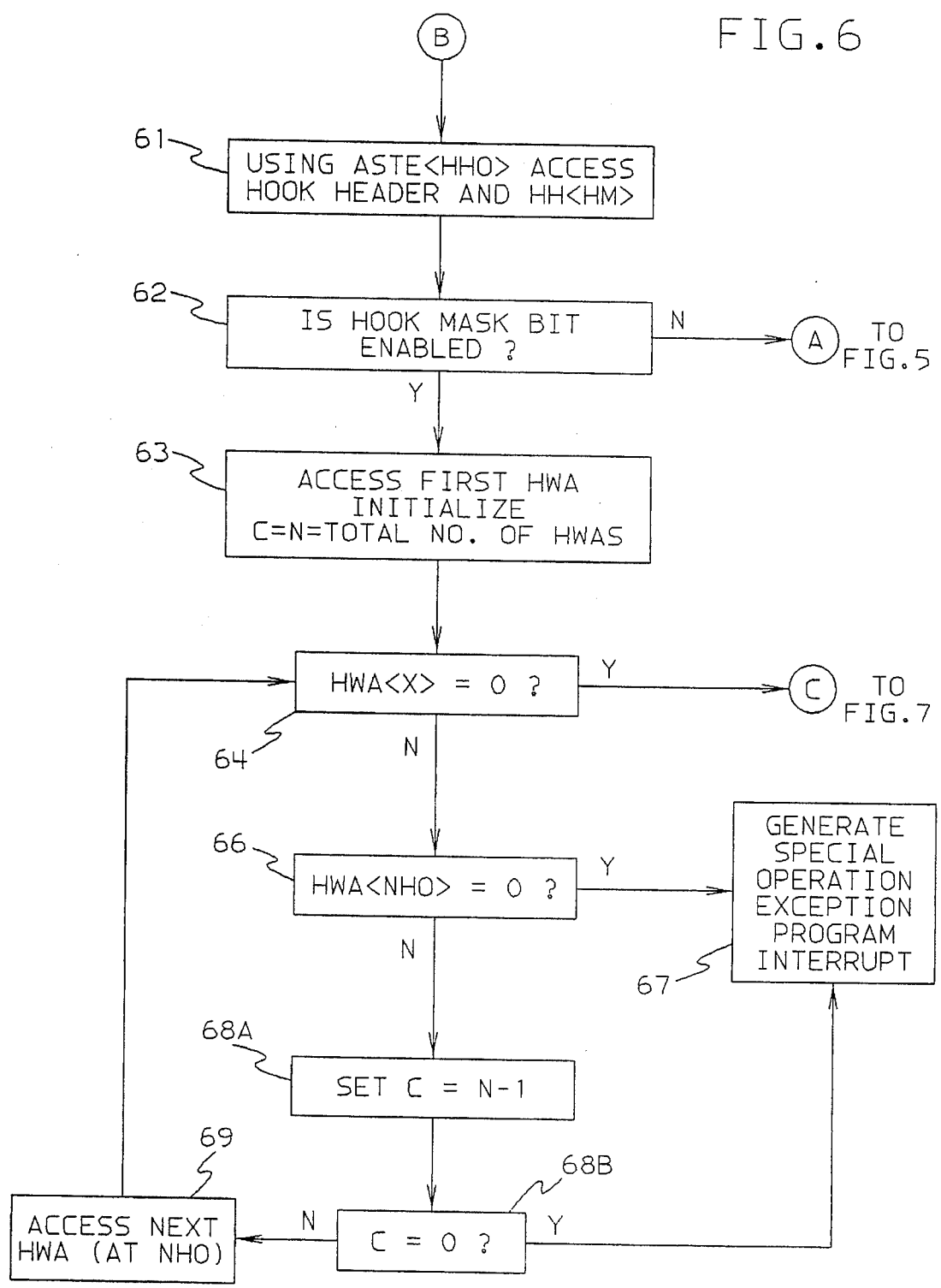
Figure 7:
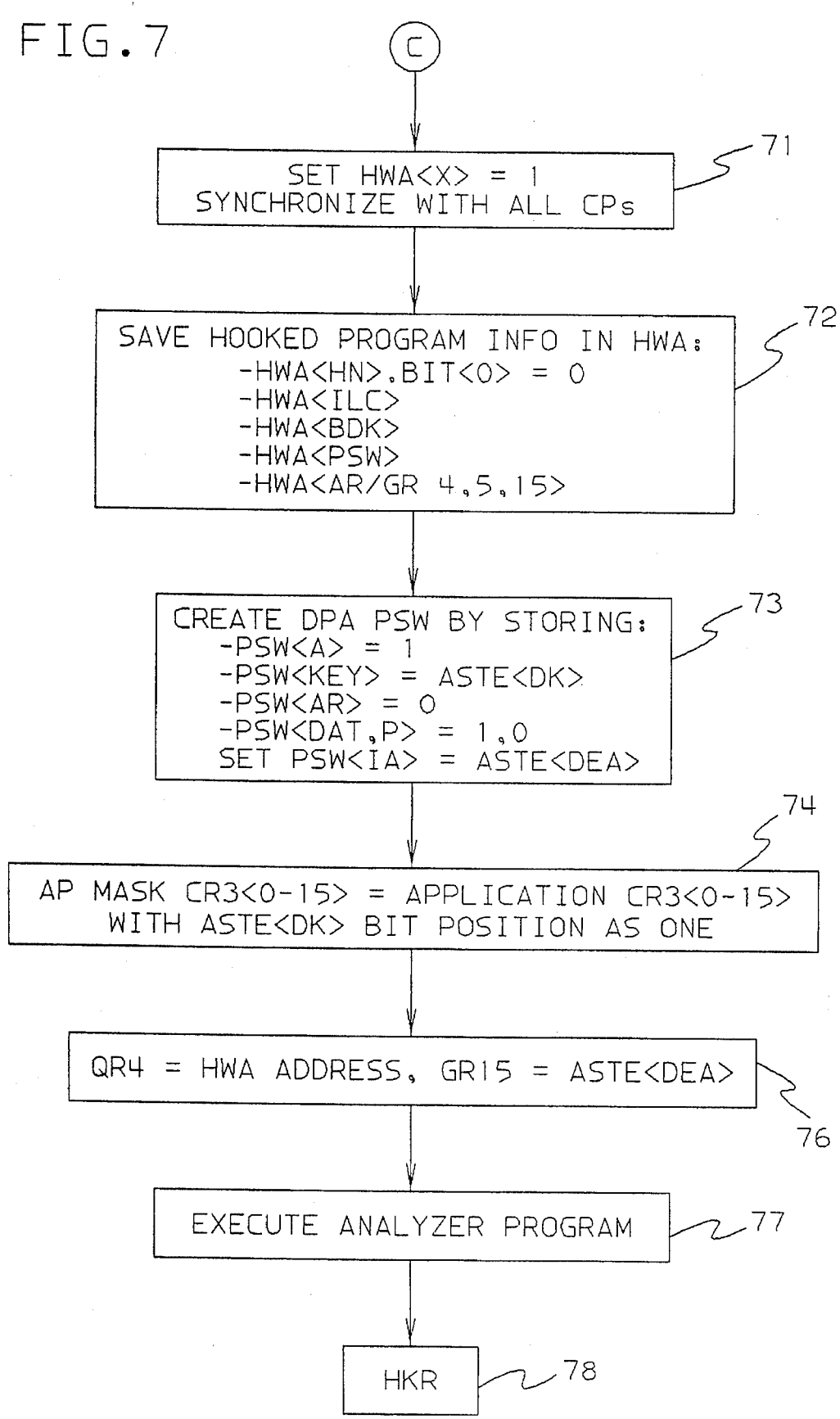

FIG. 2 represents the preferred embodiment of the invention for handling hook instructions in the environment of the ESA/390 architecture, using either a hook mask (HKM) instruction or a hook unmask (HKU) instruction, and a hook return (HKR) instruction. Although described in the context of the ESA/390 architecture, this disclosure is applicable to most computer architectures. The HKM and HKU instructions operate similarly, but they are generally designed to be inserted differently in hooked programs. The HKM instruction is provided for use in programs originally designed to contain hooks, in which HKM instructions are contained in such a program when it is compiled and tested. This intended environment for the HKM instruction allows it to have any size required for obtaining several different types of control over its operation. FIGS. 5, 6 and 7 represent the process used for controlling the execution of the HKM instruction whenever it is encountered in any hooked program.

Figure 8:
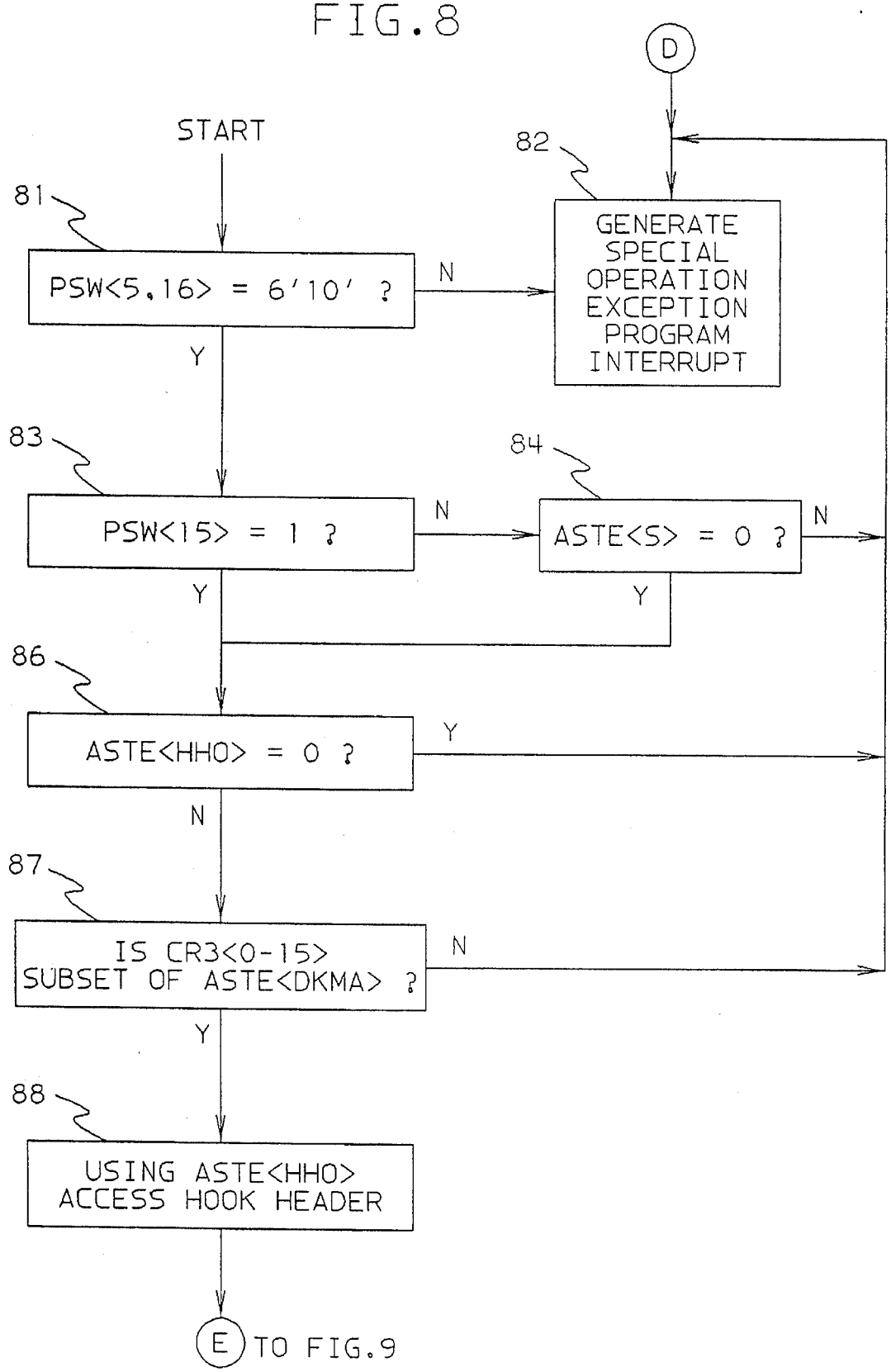
FIGS. 8, 9 and 10 represent a flow diagram of a process used by the hook unmask (HKU) instruction.
Figure 9:
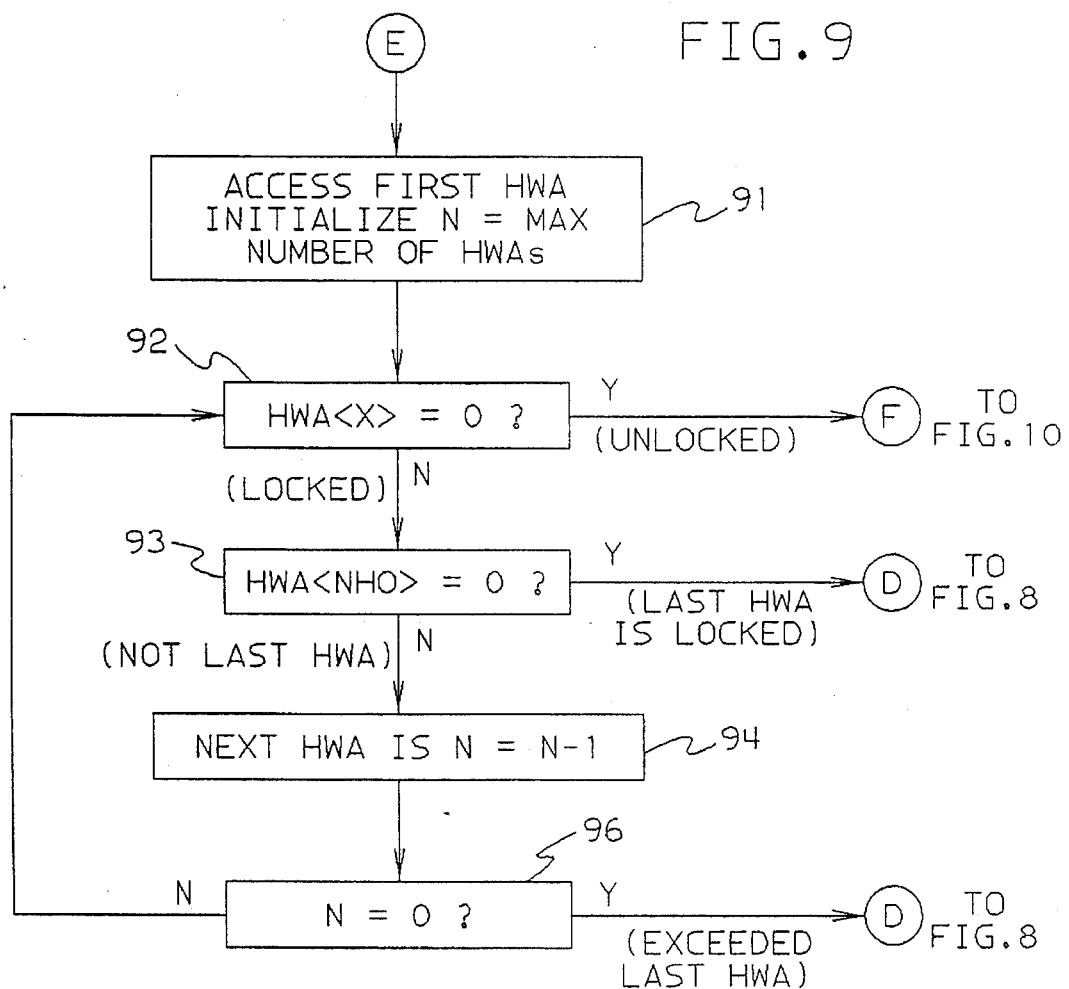
Figure 10:
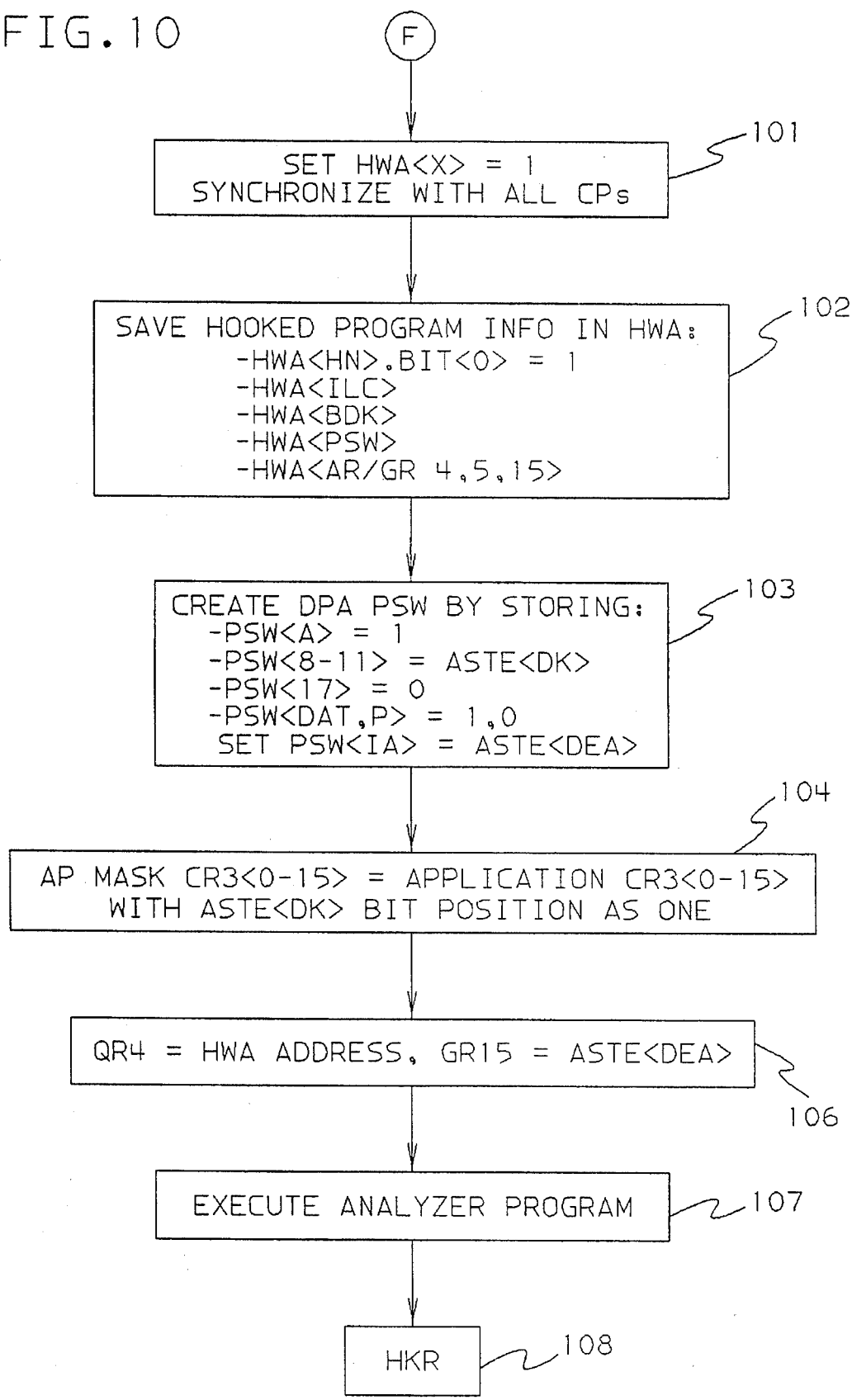

On the other hand, the HKU instruction has its preferred use in programs originally designed and tested without any hook instructions. The HKU instructions are thereafter inserted by overlaying an existing instruction or data item in the object code of such a program. Thus a HKU hooked program may fail because insertion of HKU instructions over originally-compiled code may damage it (since such a program was not tested with the hooks when originally released into a production execution environment) unless the analyzer program is present to execute the overlaid instruction. FIGS. 8, 9 and 10 represent the process used for controlling the execution of the HKU instruction whenever it is encountered in any hooked program. The analyzer program is responsible to place the HKUs over existing program instructions to cause entry to it if the program reaches that point. The analyzer program is responsible for performing or simulating the overlaid instruction execution, on entry or as part of the resumption of the hooked program.

The HKM instruction provides a mask number in an operand. The HKU instruction does not have any operand (and therefore has no mask number). Accordingly, the HKU instruction is made correspondingly smaller in size than the HKM instruction size so that it can overlay a single instruction in all cases, simplifying the analyzer program's job of executing the instruction that was overlaid.

The operand of each HKM instruction has the base+displacement (B, D) form used in calculating an S/370 operand address, but for the HKM instruction the low-order bits of the calculated address value are interpreted by the processor instruction unit as a mask number and not as an address. The user may chose different mask numbers to distinguish different HKM instructions placed at various points in a hooked program. When a HKM instruction is executed, its mask number is used as an index into a mask field located in the hook header area 22B for selecting a mask bit position. If the bit at the indexed mask position has an enabled state, the HKM instruction is enabled, and execution continues for the HKM instruction. The mask number is stored in an assigned HWA for the current instance of execution for the HKM instruction. If the indexed mask bit is in a disabled state, the HKM instruction is disabled, and its execution ends, in which case it is handled as a no-op instruction.

Accordingly, enablement can be separately controlled for HKM instructions assigned different mask numbers, allowing them to be controlled by their mask numbers. Hence, any execution of a hooked program (having HKM instructions with subsets of different mask numbers) may have any subset(s) enabled and any other subset(s) disabled, so that only subset(s) of interest perform a monitoring function. This selective enablement of the subsets affects the execution speed of the hooked program and the type of information collected by its hook instructions. Different subsets may be enabled at different times, depending on what is to be analyzed at any particular time.

In FIG. 2, the hook mask in hook header 22B is divided into two classes of mask bits, of which class 1 is the left-hand group and class 2 is the right-hand group. Dividing the mask into plural groups allows easier maintenance of the mask bit enablements, since at any time only the bits in one of the classes might be changed; for example, an entire class may easily be disabled by merely setting all bits in the class to disabled state. On the other hand, the separate classes may be controlled by separate summary bits in the hook control area, which controls can be set only by the operating system. The two classes allow two programs in a programming hierarchy (e.g. a subsystem and its applications) to use the analyzer independently for their own purposes without negotiation of the hook numbers. The OS can assign programming subsystems one class, and applications the other class.

Thus, the hook class summary control bits provide a second level of masking control, and the individual mask bits within each class, addressed by the HKM instruction, provide a third level, with both of these levels operative under the overall masking control provided by bit H in control register 2 (CR2).

Neither of these mask controls is used for the execution of an HKU instruction. HKU instructions are unconditionally executed. However, the address in the PSW stored into the HWA for a HKU instruction represents the location in the hooked program following the current HKU instruction, which may be used to distinguish the HKU instruction from other HKU instructions in a hooked program. This PSW information is also available in the HWAs assigned for HKM instruction executions. Further, while there is no hook number associated with an HKU instruction, bit zero of the hook number field in the HWA is set to a one for a HKU execution to distinguish this from an HKM instruction execution, for which this bit zero cannot be a one.

The embodiments in FIGS. 1 and 2 each provide real time monitoring for a hooked program, which is done with significantly less overhead than when using the prior-art monitor call (MC) hook instruction. For example, if the MC instruction is used to invoke an analyzer program having X instructions, the MC instruction will invoke a program interruption that executes an additional Y instructions in the operating system (OS) required to service each MC execution. Then a total of (X+Y) instructions are executed per single execution of the analyzer program. With the embodiment of the subject invention in FIG. 1 or 2 only the X instructions in the analyzer program are executed to provide performance ratio of (X+Y)/X, which allows the invention to execute significantly faster on the same speed processor to obtain the same monitored information.

The embodiment in FIG. 2 supports having one storage key used by each hooked program 20 in an address space, and having one or more other storage keys used by the remaining storage areas 22 through 25 in FIG. 2. For example, the public storage key (PSK) disclosed in patent application Ser. No. 07/710,875 (previously cited herein) may be used by each hooked program 20, and the hooked programs and/or the analyzer program 25 may be simultaneously executing on different processors in a multi-processor environment. By assigning the PSK to all hooked programs but only to them, no instruction in any hooked program (often a program being debugged) can perform a wild store into analyzer program 25, any HWA, or into the hook control area.

Hook Control Area 22A (ASTE)

In FIG. 2, the access linkage from a hook instruction in hooked program 20 to the hook control area 22A and 22B is implemented by using the S/390 virtual address space architecture, in order to obtain the accessing security and data integrity obtained by using the S/390 architecture. The structure of the preferred embodiment in FIG. 2 puts part of the hook control area into a S/390 control block called an Address Space Table Entry, ASTE 22A. An address in ASTE 22A points to a hook header area 22B, which is contained in the hook control area 12 in FIG. 1.

In FIG. 2, control register 21 (which contains the overall enablement field H) also contains an "AS address". The AS address determines the location in the computer's real memory of items 20 and 22–25 in FIG. 2.

The operation of control register 21 herein follows the IBM S/390 computer architecture described in an IBM publication "S/390 Principles of Operations" having form number SA22-7201-00, in which control register 21 is presumed to be CR2. The AS address shown herein in CR2 is called "DUCTO" in the S/390 architecture, in which DUCTO locates a supervisory control block called "DUCT" in the computer real memory. Within DUCT, a predetermined location called "ASTEO" contains an address which locates in the memory another control block called "ASTE". ASTE 22A contains parameters which define a virtual address space containing items 20, 22B25 in FIG. 2.

CR2, DUCT, and ASTE are accessible only through a supervisory operating system (OS) service, which sets up and initializes the items 20, 22–25 before the operations described for this embodiment can start. Hardware/microcode supporting the execution of each HKM or HKU instruction thereafter accesses the hook control areas 22A and 22B when the instruction is executed. Thus, any user of hooked program 20 and analyzer program 25 does not need and does not have direct access to hook control area 22A. The analyzer program should have access to area 22B in order to perform its full function, but a hooked program 20 can be denied access to area 22B if it is run with a different storage access key than the analyzer program.

Hook-Header Origin (HHO) in area 22A locates hook header area 22B. In FIG. 2, the first HWA 23 is shown appended to HHO 22B which starts on a 4 kilobyte page boundary divided into equal units each containing 128 bytes. The first 128-byte unit contains the hook header area 22B, and the next 128 byte unit is the first HWA 23.

The hook mask in area 22B is divided into two groups of mask bits, called classes 1 and 2. Class groupings of mask bits provide speed up for certain types of operations and provide another level of operational control, such as the operating system setting a summary control bit in the hook control area to enable/disable each class separately. Separate masks with separate enabling controls allow concurrent use of hooking instructions and the analyzer by different groups of programs, each group of a different origin, function, or authority but in the same virtual address space. The hook mask bits are located in the hook header in order to allow the analyzer to freely change their settings without control program intervention at different times during a session of analyzing a hooked program.

Storage Keys

The preferred embodiment in FIG. 2 also uses storage key controls found in the S/390 architecture. The keys control authorization by a program to access any location in the real memory of a S/390 or a S/370 computer system. Each storage key is a 4-bit field which controls access to a 4 kilobyte page in the memory. The key values are initialized by the OS. Authorization is provided to a program by setting its currently authorized key value into a key field in the PSW of the program. The authorized value in the PSW (for the hooked program or analyzer program) must match the storage key value for the page in real memory containing the location for which access is being requested before the access occurs. The S/390 architecture provides a PSW key mask in a control register which contains all keys which may be used by the program in execution. The analyzer may obtain an additional key (beyond that authorized for the hooked program) as part of the hook instruction execution in the hooked program.

AP state control bit (S) is provided as a relative-state interlock field in the ASTE. Bit S prevents the analyzer program 25 from receiving control in supervisory state when program 20 is operating in supervisory state, in order to allow the use of an analyzer program that requires no special authorization, and that does not have to be prepared to deal with the responsibilities of supervisory-state execution.

If S=1, the analyzer program can only execute in problem state with problem state exits.

If S=0, the analyzer program must be prepared to be entered in either problem state or supervisory state. The hooking action does not change privilege state.

The analyzer program need not be loaded into the system for the program containing hook instructions to be executable in a system, as long a the Hook-Header-Origin (HHO) is zero. Then, if the analyzer program is later loaded, it is executed when an enabled HKM instruction is executed in the hooked program.

AP entry address (APEA) is a 31-bit logical address which specifies the entry point to analyzer program 20 in the address space defined by the ASTE.

AP Key Mask Authority (APKMA) is a 16-bit field which specifies the maximum PKM (program key mask) authority the analyzer program may have. The control program, before setting S=1 must insure that the mask bit in APKMA, corresponding to the AP key specified by the APK field, is enabled (set to one). In the S/390 architecture, the PKM is contained in bit locations 0–15 in CR3. The PKM bit associated with APK must be enabled for any HKM or HKU instruction to execute the analyzer program.

The hook header area (HH) contains one 8-byte field used by the HKM instruction to enable specific mask values.

Hook mask (HM) is a sixty-four bit field, each bit of which corresponds to one of the 64 possible values in the sequence 0 to 63 of the six low-order bits (bits 26–31 in this embodiment) in the second operand address generated for an HKM instruction to provide its assigned hook number.

Before entry to the analyzing program is allowed for an HKM instruction, the bit in the hook mask at the index equal to the hook number is checked for an indication of whether the HKM instruction is enabled. If enabled, an available HWA is located and assigned to the HKM instruction for this instance of its execution. An HWA must similarly be found for the execution of an HKU instruction, which requires no mask tests. In either case, if no available HWA is found, a special-operation exception is recognized as part of the execution of this HKM or HKU instruction.

The hook-work-area (HWA) is located in the virtual space defined by a segment table descriptor (STD) in the ASTE addressed by the ASTEO field in the DUCT addressed by control register 2 in the executing processor. Each HWA is a 128-byte block. The first HWA is located just after HH. HWA contains defined fields to be tested by hook instructions, space is provided to save certain status of the program under analysis, and space that contains status for entry into the analyzer program. HWA fields are:

Next-HWA origin (NHO) is 24 bits, with seven zeros appended to the right, forming a 31-bit logical address pointing to the next 128-byte HWA in the chain of HWAs. An all zero value for NHO indicates this is the last HWA in the HWA chain.

Hook-in-process flag X is a 1-bit lock field which controls access to the HWA. An HKM or HKU instruction can access an HWA only if its X=0. An HKR instruction at the end of the analyzer program is executed only if X=1 in the assigned HWA.

Hook-number tested (HN) is a 32-bit field. Its high-order bit has a zero value for an HKM instruction, and has a one value for HKU instruction. Its remaining bits 1–31 receive the value of bits 1–31 of the second operand of the HKM instruction, or all zeros in case of an HKU instruction.

Instruction-length-code (ILC) value is saved so that the analyzer program can distinguish between a current HKM, HKU, or Execute instruction.

Hooked Program PKM bit-DK (BDK) is a 1-bit field, as part of HKM/HKU execution, is set to the hooked program PKM bit that represents ASTE<DK>. HKR uses this bit to recreate the hooked program PKM from the PKM of the analyzer.

Contents of the Program Status Word (PSW) in the processor executing the hooked program is saved in the assigned HWA at the successful execution of a HKM or HKU instruction in a 64-bit field. The analyzer program has read/write access to its assigned HWA, and hence can change any field. But only the following PSW fields (indicated by PSW bit positions in brackets) are restored into the hooked program PSW by hardware/micro-code operation for an HKR instruction:

PSW<8–11>: In problem state, this hooked program key value is checked (by ANDing the PKM bits for both the HP and the AP) as part of the HKR instruction execution to insure the enablement of the key. In supervisor state, this enablement checking is not performed.

PSW<17>: This address space control bit may be changed by the analyzer program. Since PSW<5,16> is b'10' for the analyzer program, and these PSW bits are returned to the hooked program unmodified, the hooked program may be given back control either in primary or AR mode.

PSW<18–19>: The condition code may be modified by the analyzer program.

PSW<20–23>: The program mask may be modified by the analyzer program.

PSW<32>: The saved addressing mode of the hooked program is restored on a HKR instruction execution. The analyzer program can change it and return control to the hooked program either in 24-bit or 31-bit effective-address generation mode.

PSW<33–63>: The return instruction address may be modified by the analyzer program.

The access register/general register pair is represented by the notation, AGR. The content of the AR designates an address space, which can can contain up to 2**31 bytes. The associated GR designates a byte address within the AR designated address space. This invention does not require that the content of all of the AGRs be stored in the HWA associated with an executing hook instruction. Accordingly, in this embodiment, only the following AGRs are stored in the associated HWA.

AGR 4: The contents of the AR/GR 4 are saved.

AGR 5: The contents of the AR/GR 5 are saved.

AGR 15: The contents of the AR/GR 15 are saved.

Selected programming field(s) may be saved for analysis by the analyzer program. An example would be to store other AR/GR pairs as necessary. The analyzer program may also store a pointer to an area to save Floating Point Registers or other AR/GR pairs. This HWA field, reserved for AP use, is 32-bytes in length.

Hook Mask Instruction (HKM) Execution Process - FIGS. 5–7

The flow diagram comprising FIGS. 5, 6 and 7 illustrates process steps used by a processor executing a hook-under-mask instruction, HKM, which involves accessing the memory blocks 20 through 25 and control register (CR2) shown in FIG. 2. (The analyzer program is in the same virtual address space as the hooked program, so that either program might have branch instructions that could access the other program, if the storage key allows it.)

The HKM execution process begins at step 50, at which the processor accesses and tests the overall enablement state of bit H in control register 2 (CR2). If bit H is not enabled (e.g. set to zero), the "no" (N) exit is taken from step 50 to step 51, which effectively ignores the HKM instruction by handling it as a no-op, and goes to the next sequential instruction in the hooked program.

If the H bit in CR2 is set to its enabled state (e.g. set to a one state), the process continues, in which case the "yes" exit (Y) is taken from step 50 to step 52. Step 52 tests two separate state bits in the current PSW of the processor, which are the PSW bits located at its bit positions 5 and 16. PSW bit 5 indicates if the DAT (dynamic address translation) state is on/off, and PSW bit 16 indicates if the secondary or primary address space mode exists. This invention supports hooking in primary or access-register mode operations. Step 52 requires the DAT state be on and the secondary mode be off (primary mode is then on); this condition is indicated when bits 5,16 respectively indicate 1,0. If step 52 finds bits 5,16 indicate 1,0 then the "yes" exit is taken to step 53.

But if step 52 finds bits 5,16 do not indicate 1,0 then the "no" (N) exit is taken from step 52 to the A entry to step 51, which effectively ignores the HKM instruction by handling it as a no-op, and going to the next sequential instruction in the hooked program.

If step 53 is entered, it sends the B, D operand in the HKM instruction to the instruction adder in the processor to add the content of base register B to displacement field D in the instruction. The adder outputs a 31 bit value (within a 32 bit word). This 32 bit word is not handled as an address, but instead its bit positions 26–31 are handled as a "hook number" for the current HKM instruction, and step 54 is entered. The six bits in positions 26–31 represent the hook number of the current hook instruction, which has a value in the range 0 to 63 for this embodiment. Step 54 determines if the value is in the first half or second half of the 0–63 range, which is indicated by the value of the bit at position 26. If bit position 26 is zero, the hook number is in the range 0–31 (called the class 1 range). If bit position 26 is one, the hook number is in the range 32–63 (called the class 2 range). Then step 55-1 is entered to test the state of mask bit H1 (in ASTE control block 22A) which is set to a zero or one state to indicate the mask state for the class 1 range.

But if bit position 26 is one, the hook number is in the range 32–63 (called the class 2 range). Then step 55-2 is entered to test the state of mask bit H2 which is set to a zero or one state to indicate the mask state for the class 2 range.

Then step 56 is entered to determine if the selected class mask bit (H1 or H2) is enabled. If it is disabled (in zero state), the hook instruction is disabled and the "no" exit to A is taken, entering the no-op step 51 (explained above).

But if step 56 finds the selected class mask bit is enabled (e.g. in a one state), the hook instruction needs to have its third level of enablement control examined, and needs to determine if any integrity rules have been violated. To do this, the process goes to step 57.

The next step 57 determines if an integrity rule is being violated, which is that a hooked program operating in supervisory state is not allowed to access an unauthorized analyzer program designed for problem-state usage only. However, a hooked program operating in problem state is allowed to access an analyzer program designed to operate in either problem state or supervisory state.

The problem/supervisory state for the hooked program is indicated by the state of the processor's current PSW bit 15. The problem/supervisory capability of the analyzer program is indicated by the state of bit S in the current ASTE.

Therefore, step 57 tests PSW bit 15 of the processor executing the hooked program. If the hooked program is in supervisory state, step 58 is entered to test the expected analyzer program's state (stored in ASTE bit S) to determine if the analyzer program is allowed to execute in supervisory state. If step 58 determines the analyzer program is to execute in problem state only, an integrity exposure exists, and the "no" exit is taken to no-op step 51.

However, step 59 is directly entered from the "yes" exit of step 57 if step 57 finds the hooked program is executing in problem state. Or step 59 is entered from the "yes" exit of step 58 if it finds the analyzer program is capable of executing in supervisory state.

Step 59 provides further integrity control on the execution of the hooked program, regarding specific control over protect key enablement. Step 59 tests whether the hooked program's key enablement is a subset of the key enablement provided for analyzer program in the ASTE. The ASTE field DKMA contains a key mask of the maximum key authority allowed for the analyzer program; field DKMA has a one bit at the index of each PSW key allowable for the analyzer program. Thus, step 59 compares the bit in CR3 at the index of the PSW key of the hooked program with the corresponding indexed bit in the ASTE<DKMA> field, and if they are equal the "yes" exit to continue the process in FIG. 6 is taken. If they are unequal, the "no" exit A is taken to no-op step 51. Step 59 does this by testing if the hooked program's key mask in CR3 is a subset of the current analyzer program's maximum authority key mask stored in ASTE<DKMA> field. A subset PKM exists in CR3 for the hooked program if each bit in CR3 is equal to or less than the corresponding-located bit in ASTE<DKMA>; i.e. or 1, but if the ASTE<DKMA> bit is 0 the corresponding bit in CR3 must be a 0 (and the "no" exit A is taken to no-op step 51 if that CR3 bit is a 1). The hooked program is thus prevented from passing an access key to the analyzer which is not authorized by the ASTE for the analyzer use.

Then, step 61 in FIG. 6 accesses a hook header origin field (HHO) in the ASTE. HHO contains the address for locating a hook header (HH), and HH contains a third level hook mask control used to determine the enablement/disablement for the current HKM instruction's hook number in its selected class (whether class 1 or 2). Previously executed steps 50 and 56 determined that the current HKM instruction is enabled by its first and second level enablements, and step 55 determined that the current hook number is in either class 1 or 2. The third level enablement for the current HKM instruction is indicated by the state of a bit in the HH field, indexed by the value of the five operand bits 27–31 (next to the class selection bit 26). The value of this indexed HH bit is tested in step 62 to determine if the HKM instruction is enabled at the third level; and it is enabled if the indexed bit is one and step 63 is entered. But if the indexed bit is disabled (zero), the no-op step 51 in FIG. 5 is entered.

Step 63 starts a sub-process of steps 64 through 69 which finds an HWA (hook work area) for assignment to the current HKM instruction. There are a maximum of N number of HWA blocks initially allocated to a hook header, which are shown in FIG. 4 as HWA1 through HWA-N that are contiguously located within system main memory, in which HWA-1 is located adjacent to the hook header 22B. (The HWAs may be located non-contiguously by providing a chaining address field in each HWA.)

All, some, or none of the HWAs may be available for assignment to the current HKM instruction. And some or all of the HWAs may be unavailable because they are being used by concurrently executing HKM or HKU instructions. The embodiment being described may, for example, have 128 bytes in each HWA block. When any HKM instruction completes its processing of the analyzer program, its HWA is again made available for reassignment to the execution of another HKM or HKU instruction.

Step 63 initializes the HWA selection sub-process by loading the N value into an HWA address control field, C; and the first HWA-0 is accessed and tested for its selectability. There are two fields which are tested in each accessed HWA, which are a "hook-in-process" field (X), and a "next HWA origin" (NHO) field. The X field indicates if the HWA is available or not available for selection and assignment to the currently requesting HKM instruction. The NHO field indicates if this is the last HWA block. (The NHO field also may contain an index to the next HWA block if the HWAs are in a non-contiguously located chain.) The value zero is used in the NHO field to indicate if it is in the last HWA. And a non-zero NHO value (such as a one for contiguous HWAs, or a pointer value for non-contiguous HWAs) indicates the HWA is not the last. A non-zero X value indicates the HWA is not available, and a zero value in the X field indicates the HWA is available.

Hence, next step 64 tests if X=0 in the currently accessed HWA. If X=0, the HWA is available, and a branch is taken to FIG. 7 in which this HWA is assigned to the current HKM instruction. If X=1, the HWA is not available, and the process goes to step 66 to test the NHO field to determine if this HWA is the last in the set of HWAs 0–N, in which case there is no HWA currently available, and step 67 is entered to generate a special-operation exception which interrupts the HKM execution process for special handling by the OS. The special handling may involve dispatching the processor to another task, while the currently-interrupted HKM instruction is waiting for an HWA to be made available as soon as its assigned HKM instruction completes its analyzer program processing. OS may dispatch the interrupted process after a predetermined period of time expires, on the likelihood that by then one or more of the HWAs has become available.

But if the current HWA is not the last (NHO is non-zero in the current HWA), then step 68A is entered to decrement the HWA address control field C. Then step 68B tests the current value of C, which must be one of the HWA indices, 1 through N (C=0 is an invalid value). If step 68B finds C=0, the "yes" exit is taken to step 67 for a special operation exception to be serviced by the OS. If step 68B finds C is non-zero, the "no" exit is taken from step 68B to step 69 which accesses the next HWA at the location provided in the current NHO field. Step 64 is entered to repeat the process with the content of the next HWA, etc. The looping through steps 64–69 continues until an available HWA is found or until a special exception interruption occurs. The normal situation finds an available HWA, and FIG. 7 is entered from step 64.

In FIG. 7, step 71 sets the X field to a one state to indicate this HWA is not available to any other HKM instruction. Step 71 is executed in a serialized manner to prevent contention between this and other HKM instruction concurrently executing on other processors in a multiprocessing system. Contention is avoided by preventing access by all other processors to the X field while verifying that the X field is zero before setting it to one, in a manner similar to the process of the S/390 compare-and-swap or test-and-set instruction. (Field X is tested for a zero state before it is set to one, while all other processors are prevented from changing field X during this test and set operation.) Step 71 completes the HWA selection sub-process for the HKM instruction making the search. If step 71 is unable to set the X field to a one state via this process, e.g. due to a concurrent access by another CPU, the search for an available HWA continues by looping back to step 66.

Step 72 is now entered to continue the execution of the current HKM instruction which has been assigned the HWA. Steps 72–77 in FIG. 7 perform store operations required for setting up a microcode/hardware linkage for enabling the analyzer program to be entered to continue the execution of the current HKM instruction, and for enabling a linkage usable by the analyzer program (when it has completed its execution) to enter the hooked program to continue the execution of the hooked program beyond the current HKM instruction.

Step 72 stores the following information relating to the current HKM instruction, which are stored in fields in the associated HWA:

A. A hook number field, HWA<HN>, by saving the value of bits 1–31 of the second operand (which includes its bit positions 26–31). And bit 0 in the HN field is set to zero to indicate the HKM instruction is being executed.

B. A HWA<ILC> field receives the value of the Instruction Length Code.

C. A HWA<BDK> field is a bit stored in the HWA to represent whether the PKM of the hooked program has authority to use the analyzer storage key. This is done by indexing in the hooked program's PKM (program key mask in CR3) with the value of analyzer program key stored in ASTE<DK> to find the bit in CR3 (representing the analyzer program key), and copying the setting of that PKM bit position into the HWA<BDK> bit. A 1 state indicates the hooked program has authority, and a 0 state indicates it does not have authority to access the analyzer program. This prevents the hooked program from receiving access to the APK on a hook return if it did not have it on HKM execution.

D. A HWA<PSW> field receives the processor's current PSW (upon a successful execution of the current HKM instruction).

E. The HWA fields for AR/GR pairs 4, 5, and 15 receive the current content of these respective AR/GR pairs.

The hooked program may have been assigned the public storage key (such as key 9). The public storage key prevents a program using the public storage key from accessing a storage block assigned any other key, but programs using any other key can access the program and data in blocks assigned the public storage key. If the hooked program is assigned the public storage key, it cannot access the analyzer program in storage, but the analyzer program (assigned another key) can then access the hooked program without access key manipulation.

Next, step 73 builds a PSW in a micro-code local store for later enabling the processor to start execution of the analyzer program. Step 73 stores the current processor's PSW in a local processor store, and then changes some of the PSW fields by storing into the following sub-fields in the PSW:

A. Addressing mode sub-field, PSW<A>, is set to one (for indicating the 31-bit address mode.

B. Key sub-field, PSW<key>, at PSW bits 8–11, is set to the ASTE<DK> field, which contains the PSW key for the analyzer program.

C. Address-space control sub-field, PSW<AR>, (at PSW bit 17) is set to 0 to indicate that primary mode is being used.

D. DAT mode and primary-space mode sub-fields, PSW<5,16>, remain at the 1,0 states.

E. Instruction address sub-field, PSW<IA>, is set from field ASTE<DEA> to the entry address of the analyzer program.

Step 74 generates a PKM for use by the analyzer program, which is about to be invoked. The analyzer program uses the hooked program's PKM in CR3, with the addition of enabling the analyzer program's key. This is done by indexing to the analyzer program key bit in CR3 and setting it to a one state (the ASTE<DK> field provides the indexing value). This CR3 mask setting operation assures that the analyzer program will be able to access its own storage including the HWA.

Next, step 76 saves the address of the associated HWA by storing it in general register AR/GR 4. AR/GR 5 is left free for use by the analyzer program. AR/GR 15 is loaded with field ASTE<DEA>, which is the entry address to the analyzer program. This provides the analyzer program with the base address of its own location in the address space.

Step 77 then uses a load PSW instruction to load the PSW (constructed by step 73) into the processor as its current PSW (having an instruction address which is the entry address to the analyzer program). This starts execution of the analyzer program, which continues its execution until it reaches a hook return (HKR) instruction in step 78 at the end of the analyzer program.

Hook Unmask Instruction (HKU) Execution Process - FIGS. 8–10

The hook unmask (HKU) instruction differs from the hook mask (HKM) instruction by the HKU instruction not having any hook number operand. This enables the elimination of an operand field (e.g. B,D) for the HKU instruction, making it correspondingly smaller in size than the HKM instruction. The HKU instruction has only an operation code (op code).

The smaller size of the HKU instruction enables it to be used with more facility than the HKM instruction for placing hooks in programs previously tested without hooks, and for which no new program test is contemplated after inserting hooks, which is done by overlaying some of the existing code in the program with the HKU instruction.

The flow diagram comprising FIGS. 8, 9 and 10 illustrates process steps used by a processor executing a hook-unmask instruction, HKU. Its execution process begins at step 81, at which the processor tests its operating modes to determine that the hooked program is in DAT mode and in primary space mode in the S/390 computer architecture.

If step 81 finds the bits at PSW bit positions 5 and 16 are in the 1 and 0 states, respectively, then the "yes" exit is taken to step 83.

But if step 81 finds bits 5,16 do not indicate 1,0 the "no" (N) exit is taken from step 81 to the D entry to step 82, which generates a special-operation exception which interrupts the HKU execution process for special handling by the OS. The special handling may involve dispatching the processor to another task. Since use of the HKU instruction is assumed to involve overlay of tested program code, any unexpected event makes further execution of the hooked program suspect, and must be monitored by OS.

If step 83 is entered (the normal case), it determines if an integrity rule is being violated, which is that a hooked program operating in supervisory state is not allowed to access an unauthorized analyzer program designed for problem-state usage only. However, a hooked program operating in problem state is allowed to access an analyzer program designed to operate in either problem state or supervisory state.

The problem/supervisory state for the hooked program is indicated by the state of the processor's current PSW bit 15. The problem/supervisory capability for the analyzer program is indicated by the state of bit S in the current ASTE.

Therefore, step 83 tests PSW bit 15 of the processor executing the hooked program. If the hooked program is in supervisory state, step 84 is entered to test the expected analyzer program's state (stored in ASTE bit S) to determine if the analyzer program is allowed to execute in supervisory state. If step 84 determines the analyzer program is to execute in problem state only, an integrity exposure exists, and the "no" exit D is taken to step 82 which generates a special-operation exception and interrupts the HKU process.

Step 86 is directly entered from the "yes" exit of step 83 if step 83 finds the hooked program is executing in problem state. Or step 86 is entered from the "yes" exit of step 84 if it finds the analyzer program is capable of executing in supervisory state.

Then, step 86 in FIG. 8 accesses the hook header origin field (HHO) in the ASTE. HHO should contain the address for locating a hook header (HH). The HHO address locates the first HWA, which is located next to the HHO area. The HHO address is a non-zero value, and step 86 tests if it is the not allowable zero value (such as might occur if it were not initialized). If it is zero, its "yes" exit D is taken to enter step 82 which generates a special-operation exception and interrupts the HKU process.

No enablements/disablements are used for the HKU instruction, and therefore the CR2 H field, the ASTE fields H1 and H2, and the hook mask field HM are not used by the HKU instruction. (They are only used for the HKM instruction.)

Step 87 is directly entered from the "no" exit of step 86 if step 86 finds a non-zero value for the HHO. Step 87 provides an integrity control on the execution of the current hooked program to assure the hooked program does not have greater access authority than the analyzer program. Step 87 does this by testing if the hooked program's key mask in CR3 is a subset of the current analyzer program's maximum authority key mask stored in ASTE<DKMA> field. A subset PKM exists in CR3 for the hooked program if each bit in CR3 is equal to or less than the corresponding-located bit in ASTE<DKMA>; i.e. or 1, but if the ASTE<DKMA> bit is 0 the corresponding bit in CR3 must be a 0 (and an exception condition exists if that CR3 bit is a 1). The hooked program is thus prevented from passing an access key to the analyzer which is not authorized by the ASTE for the analyzer use.

Thus, if any bit in CR3 is greater than its corresponding bit in ASTE<DKMA>, "no" exit to D is taken to enter step 82 which generates a special-operation exception that interrupts the HKU process. But if the hooked program's key mask in CR3 is a subset of the current analyzer program's maximum authority key mask stored in ASTE<DKMA> field, the "yes" exit is taken to step 88.

Then, step 88 accesses the HHO field in the ASTE to access the hook header area, and an exit is taken to step 91 in FIG. 9. The HHO address enables locating the first HWA, which is next to the hook header area.

Step 91 starts a sub-process of steps 92–97, which is essentially the same sub-process as is explained herein for steps 64 through 69 in FIG. 6 (which find an available HWA (hook work area) for assignment to the current HKM instruction). Here, steps 92–97 find an available HWA for assignment to the current HKU instruction from the N number of HWA blocks allocated in the system. Only the exits D and F from steps 91–97 are different from steps steps 64 through 69 in FIG. 6. Exit D is taken from the "yes" exit of step 93 or step 96 to enter step 82 to generate a special-operation exception and interrupts the HKU process, if the last HWA is not available or if C=0 which is not allowed.

When an HWA is found available, it is selected and exit F from step 92 (like exit C from step 64) is taken to step 101 in FIG. 10 to continue the HKU process.

FIG. 10 is identical to FIG. 7, except that a one value is set into bit 0 of the HWA hook number field, HWA<HN>, to indicate the current instruction type is HKU. (In FIG. 7, bit 0 in HWA<HN> is set to a zero value to indicate the current instruction type is HKM.) Otherwise, the content and operation of FIG. 10 is the same as described for FIG. 7.

Figure 12:
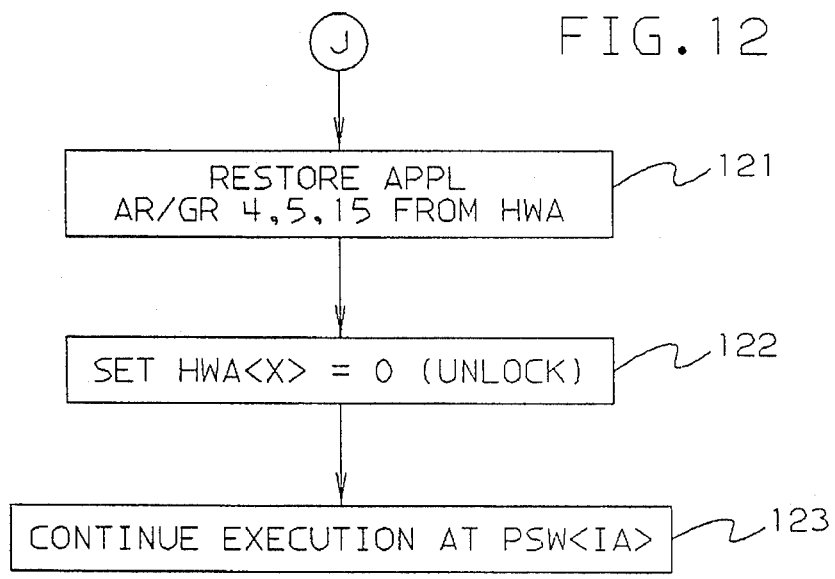
FIGS. 11 and 12 represent a flow diagram of a process used by the hook return (HKR) instruction for the embodiment in FIG. 2.
Figure 11:
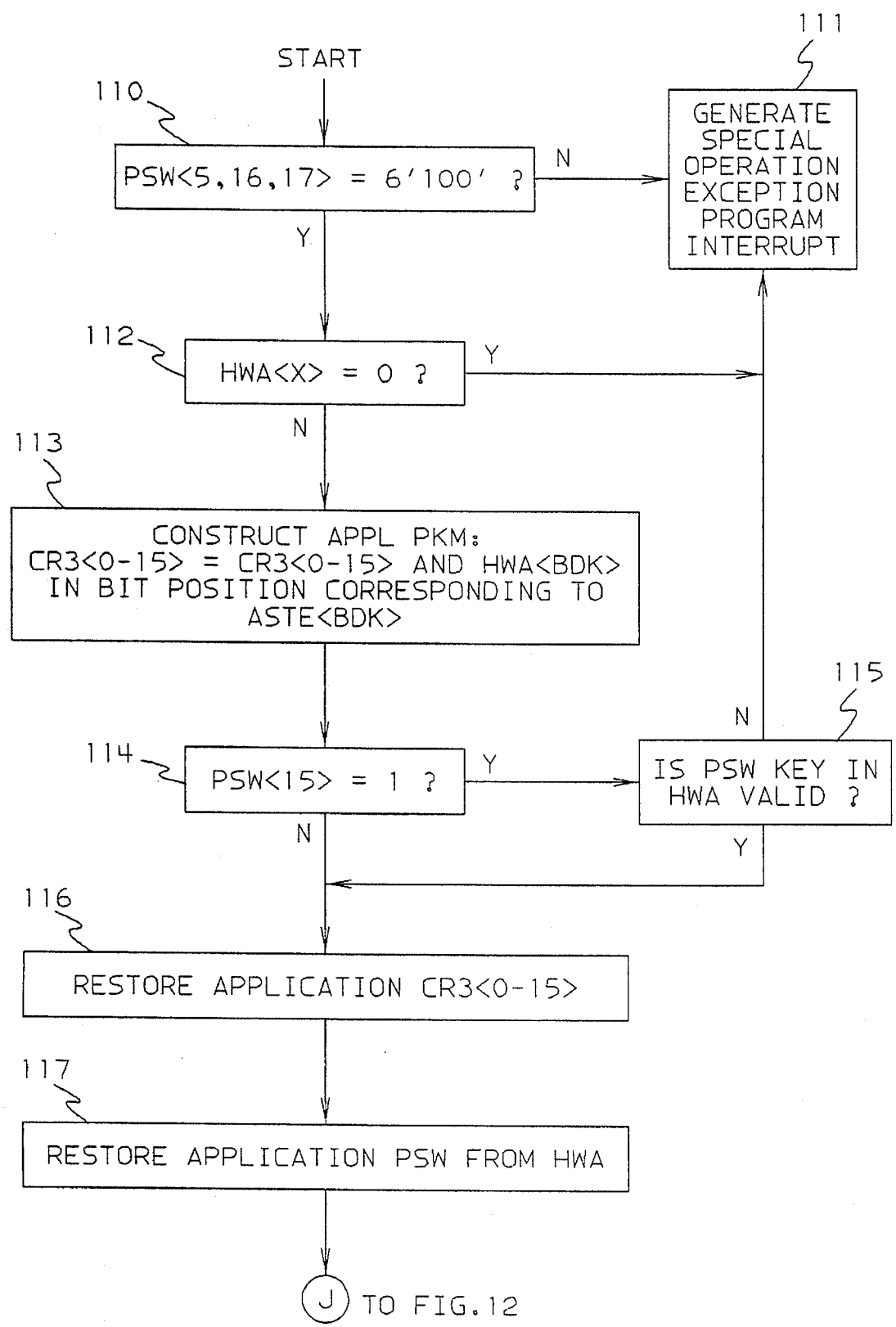

Hook Return Instruction (HKR) Process - FIGS. 11 and 12

The hook return (HKR) instruction provides a hardware and/or microcode return from either the hook unmask (HKU) instruction or the hook mask (HKM) instruction. If the saved PSW instruction address was not changed by the analyzer, the return is to the instruction in the hooked program immediately following the last executed hook instruction associated with the HWA addressed by HKR. The HKR instruction has an operation code (op code) and an operand that comprises the conventional (B)+D address values. However, this operand address is the address of the HWA currently being used by the hook instruction execution that caused this instance of analyzer execution which issues HKR to return to the hooked program.

The current HKR instruction execution is not allowed to continue if the X field in the HWA addressed by this HKR instruction indicates that the addressed HWA is available for selection, or if any PSW address mode field is incompatible with execution by the hooked program (which is again started by the return process). It is to be noted that the operating system is not involved with this return process (just as the OS has not been involved with the prior execution of the hooked program and of the analyzer program for this same hooked instruction, as long as no exception condition occurs).

The HKR instruction execution begins with step 110 in FIG. 11, which checks the addressing modes in the current PSW to determine that no incompatible addressing mode exists. Here, the PSW bit positions 5, 16, 17 must all have the respective values 1, 0, 0 for the "yes" exit to step 112 to be taken. These PSW bit values indicate the DAT, primary, and non-AR modes. If any address mode does not meet this criterion, step 111 is entered to generate a special-operation exception which interrupts the current HKR execution process and switches processor control to the OS for it to handle the problem. The special handling by OS will undispatch the execution of the HKR process from the processor and may involve dispatching the processor to another task.

If step 112 is entered (the normal case), it determines if an integrity rule is being violated, which is that the X field in the HWA must not indicate an available state (X=0) which is its unlocked state. If it finds the X=0 state, the "yes" exit is taken to step 111 for a special operation exception, as previously explained.

If step 112 finds X is not zero (locked state), then the process continues with step 113, which constructs a program key mask (PKM) in a local store (available to the processor microcode) for later use by the hooked program when it regains control of the processor. The PKM construction makes a copy of the current PKM (from CR3), then ANDs the bit stored in the HWA<BDK> field with the bit at the index ASTE<DK>, and puts the PKM aside for steps 114 and 116.

Step 114 is then entered to check whether the proposed new PSW key (HWA<PSW> bits 9–11) is covered by the new PKM constructed in step 113. If the new PKM does not include the proposed PSW key, step 111 is entered to reflect a special-operation exception. Otherwise, step 116 is entered to instantiate the new PKM.

Then, step 116 in FIG. 11 loads CR3 bits 0–15 with the program key mask (PKM) of the hooked program which was constructed by step 113 in the local work area. Then, step 117 loads the processor's current PSW with the PSW values stored in the associated HWA (located by the address stored in GR4). As described earlier, these include PSW<8–11>, PSW<17>, PSW<18–19>, PSW<20–23>, PSW<32>, and PSW<33–63>.

Step 121 in FIG. 12 is entered after step 117 executes. Step 121 loads the AR/GRs 4, 5 and 15 with the contents stored in corresponding fields HWA<AR/GR4>, HWA<AR/GR5> and HWA<AR/GR15> to restore them to the state they had when the hooked program caused execution of the current hook instruction. And the PSW stored in the HWA is copied into the microcode local store for temporary storage.

Next, step 122 recognizes that the information in the associated HWA (used by its HKR instruction, and possibly still associated with the current hook instruction) is no longer needed. Therefore, step 122 resets to zero state the X field in this HWA, which unlocks it and again makes it available for selection by another hook instruction.

Finally, step 123 immediately follows to switch processor execution to the hooked program by beginning execution under control of the PSW loaded in step 117. The hooked program then starts execution at its instruction immediately following the hook instruction last executed in the normal case.

Characteristics of the Analyzer Program Operation

The execution of the analyzer program may include several features that are not apparent, such as allowing interactive commands between the analyzer program and a human user at a display screen and keyboard to direct the analyzer program to change predetermined parameters, such as the enablement/disablement of specified HKM instructions in the hooked program, or the insertion of new HKU instructions into a hooked program, or changing the access key for the hooked program, or the address at which the hooked program will resume execution, etc.

The analyzer program has control over the selection, analysis and recording of data about the hooked program obtained from the execution of a hook instruction. Thus, the analyzer program may perform real time analysis on the hooked program during its execution, and store only its summary results. Or the analyzer program may store all analysis data in an area of memory it reserves for data gathering, and allow a batch type of analysis to be done later. Or it may allow data to be scanned on-line at a display screen.

Accordingly, this invention deals with analysis of a program in executable form of a program (in object code), and not with a program in a source code form.

The executing analyzer program normally accesses the hooked program to extract information pertinent to the currently executing hook instruction to generate and communicate hook information to the analyzer program which generates and writes monitoring/trace/debugging information in a recordable work area not accessible to the hooked program. No interruption occurs due to use of the hook instructions of this invention, whether the hook instructions are in an enabled or disabled state. Transitions between the hooked program and the analyzer program occur directly through the hooking mechanism under the constraints established at initial authorization time by the OS. No subsequent action by the OS is required in normal transitions of control between the hooked program and the analyzer program.

Many variations and modifications are shown which do not depart from the scope and spirit of the invention and will now become apparent to those of skill in the art. Thus, it should be understood that the above described embodiments have been provided by way of example rather than as a limitation.

Having thus described our invention, what we claim as new and desire to secure by Letters Patent is:

1. An execution method for obtaining a dynamic analysis of a hooked program containing hook instructions which allow the hooked program to execute in a production programming environment of a data processing system, the method comprising the steps of:

skipping execution of each non-enabled hook instruction to execute the hooked program without the hook instruction performing any operation in the hooked program, executing each enabled hook instruction, by having hardware and/or microcode in a processor perform the following steps of:

accessing a hook control area located by the processor, the hook control area containing a program entry location for starting execution of an analyzer program and an HWA (hook work area) location for a first HWA in a sequence of HWAs, the HWA's not being in the hooked program and being reusable by other hooked programs;

assigning a HWA for an instance of execution by a hook instruction, the assigned HWA being located in a memory of the data processing system, storing in the HWA a next instruction address for an instruction following the enabled hook instruction, locating an analyzer program address in controls of the data processing system unavailable to the hooked program in order to isolate and protect the analyzer program from the hooked program by not providing the hooked program with any address to the analyzer program, invoking execution of the analyzer program by the processor using the program entry location to pass processor execution control to the analyzer program to have a continuous uninterrupted execution of the hook instruction include the execution of the analyzer program, unassigning the assigned HWA to complete the execution of the enabled hook instruction and to enable later use of the unassigned HWA by a future instance of hook instruction execution, and passing processor control to an instruction address stored in the HWA at the end of execution of the analyzer program to return control to the hooked program at an instruction following the hook instruction to maintain continuous execution of the processor without interruption for execution of an operating system program.

2. An execution method for hook instructions as defined in claim 1, further comprising the steps of:

providing an operand in a maskable type of hook instruction for indicating any of multiple hook numbers for a hook instruction of the maskable type; and indexing in the mask enablement field with the hook number to locate an indication of an enablement and a disablement state for the type of hook instruction represented by the hook number to selectively enable and disable different types of hook instruction.

3. An execution method for hook instructions as defined in claim 1, further comprising the step of:

locating a plurality of class mask enablement fields in the hook control area for respectively enabling different subsets of hook numbers as different classes of maskable type hook instruction(s) in a hooked program in order to enable or disable a class as a single control operation.

4. An execution method for hook instructions as defined in claim 1, further comprising the step of:

addressing the hooked program and the analyzer program in a same virtual address space.

5. An execution method for hook instructions as defined in claim 1, further comprising the step of:

assigning the hooked program and the analyzer program to different real storage areas having different storage protect keys.

6. An execution method for hook instructions as defined in claim 5, further comprising the step of:

assigning a public storage protect key to a real storage area containing the hooked program, and assigning a non-public storage protect key to a different real storage area containing the analyzer program in a same virtual address space.

7. An execution method for hook instructions as defined in claim 5, further comprising the step of:

enabling an analyzer-program position in a storage key mask prior to starting execution of the analyzer program to allow it to operate with a different storage key than a storage key used by the hooked program.

8. An execution method for hook instructions as defined in claim 5, further comprising the step of:

disabling an analyzer-program position in a storage key mask prior to starting execution of a hooked program to prevent the hooked program from accessing a storage area containing the analyzer program.

9. An execution method for hook instructions as defined in claim 1, further comprising the step of:

executing a plurality of hooked programs on one or more processors in the data processing system, and the hooked programs being capable of concurrently executing hook instructions being analyzed by the same analyzer program, and assigning different HWAs to concurrently executing hook instructions.

10. An execution method for hook instructions as defined in claim 9, further comprising the step of:

locating the plurality of concurrently executing hooked programs and the analyzer program in a same virtual address space.

11. An execution method for hook instructions as defined in claim 9, further comprising the step of:

task switching the concurrently executing hooked programs and the analyzer program in one or more processors to allow asynchronous end-of-task exits from the analyzer program to an operating system and from the operating system back to the analyzer program to continue concurrent executions for different hook instructions in the analyzer program in a re-entrant manner.

12. An execution method for hook instructions as defined in claim 1, further comprising the step of:

loading an HWA address for the HWA assigned to the hook instruction into a predetermined general register of a processor executing the hook instruction in the hooked program, the HWA address being used at the end of execution of the analyzer program for the hook instruction to locate the HWA containing the next instruction address in the hooked program.

13. An execution method for hook instructions as defined in claim 2, further comprising the step of:

changing by the analyzer program of enablements for hook numbers within a designated mask enablement field during the execution of the analyzer program without requiring operating system intervention.

14. An execution method for hook instructions as defined in claim 13, further comprising the steps of:

concurrently-executing a plurality of hooked programs on one or more processors in the data processing system;

enabling a class of hook numbers represented within a designated mask enablement field for one of the hooked programs; and disabling another class of hook numbers represented within another designated mask enablement field for the same or another hooked program in the same virtual address space.

15. An execution method for hook instructions as defined in claim 14, further comprising the steps of:

asynchronously-executing a single copy of the analyzer program for plural independent and concurrently-executing hooked programs by multi-tasking the independent hooked programs on one or more processors in the data processing system for which the analyzer program is operated in a re-entrant manner without affecting the integrity of the programs; and assigning separate analyzer program areas for respectively receiving data generated for the single analyzer program by the independent programs to provide independent debugging information about the independent programs in areas assigned to the independent programs.

16. An execution method for hook instructions as defined in claim 3, further comprising the step of:

associating different class mask enablement fields with different programs in computer storage to enable mask hook instructions in the different programs to be independently controlled.

17. An execution method for enabling a dynamic analysis of a hooked program containing hook instructions by an analyzer program while the hooked program is executing in a production programming environment, as defined in claim 1, the method further including the step of:

storing a hook mask containing mask enablement fields in controls of the data processing system to enable or not enable each of plural types of hook instructions to execute or to not execute in the hooked program by setting on or off a respective mask enablement field for each of the types.

18. An execution method for enabling a dynamic analysis of a hooked program containing hook instructions by an analyzer program while the hooked program is executing in a production programming environment, as defined in claim 17, the method further including the steps of:

structuring the mask enablement fields in the hook mask as bit positions for respectively enabling and disabling different types of hooked-under-mask (HKM) instructions contained in hooked programs, the different types of HKM instructions containing different hook indications for selecting respective bit positions in the hook mask for indicating enablement and disablement for the different types of hook instructions, and setting an overall hook indication to either enable or disable state in controls of the data processing system, the disable state disabling all hook instructions from executing in the hooked program, and the enable state enabling execution of only the types of hook instruction indicated as being enabled by the mask enablement fields in the hook mask if the overall hook indication indicates the enable state.

19. An execution method for hook instructions as defined in claim 18, further comprising the step of:

inhibiting execution of a hook instruction if any mask enablement field indicates a specified type of hook instruction (indicated in an operand of the hook instruction) is disabled by handling the hook instruction as a non-operating instruction (no-op).

20. An execution method for enabling a dynamic analysis of a hooked program containing hook instructions by an analyzer program while the hooked program is executing in a production programming environment, as defined in claim 18, the method further including the step of:

reassigning the HWA to a later hook instruction execution in the data processing system.

21. An execution method for enabling a dynamic analysis of a hooked program containing hook instructions by an analyzer program while the hooked program is executing in a production programming environment, as defined in claim 20, processor hardware and/or microcode also performing the steps of:

storing a plurality of HWAs in a main memory of the data processing system, each HWA having a lock field settable to a lock state to permit use of the HWA for only one instance of execution for any enabled hook instruction, each HWA being available for assignment to a enabled-executing hook instruction if the lock field of the HWA is set to an unlocked state, and each HWA not being available for assignment if the lock field of the HWA is set to a locked state, scanning the lock fields of the plurality of HWAs for an enabled-executing hook instruction until an available HWA is found in unlocked state, and dynamically assigning the HWA to a current instance of execution of the enabled-executing hook instruction by setting on the lock field and writing a pointer to the hooked program in the assigned HWA, and unassigning the assigned HWA by setting its lock field to the unlocked state to change it to an available HWA upon completion of execution of the hook instruction, whereby the HWAs are reusable for other instances of execution by the same or another hook instruction.

22. An execution method for hook instructions as defined in claim 21, further comprising the steps of:

placing an address to a first HWA in the hook control area;

putting an assignment indicator and a chain address in each HWA to locate each next HWA in the sequence of HWAs to enable searching for assignment state in the sequence of HWAs; and placing a last HWA indicator in the last HWA in the sequence.

23. An execution method for hook instructions as defined in claim 22, further comprising the steps of:

contiguously locating the HWAs in computer memory from the first HWA at indexes which are multiples of an HWA block size.

24. An execution method for hook instructions as defined in claim 23, further comprising the step of:

signalling a special exception condition to processor(s) if no HWA is found to have an unassigned state.

25. An execution method for hook instructions as defined in claim 1, further comprising the step of:

executing the analyzer program in supervisory state for each enabled hook instruction upon being invoked by the processor when the hooked program is executing in supervisory state.

26. An execution method for hook instructions as defined in claim 1, further comprising the step of:

executing the analyzer program in problem state for each enabled hook instruction upon being invoked by the processor; and signalling a special exception condition to an operating system if a hooked program containing the hook instruction is operating in supervisory state.

27. An execution method for hook instructions as defined in claim 1, further comprising the step of:

structuring a type of hook instruction to comprise only an operation code to obtain a reduced size for overlaying existing code in a program to which one or more hook instructions are added without masking selection control, so that the hook instruction cannot overlay more than one instruction in storage.

28. An execution method for hook instructions as defined in claim 1, further comprising the step of:

structuring a return-from-hook instruction to comprise an operation code and an operand for passing processor control to an instruction at an instruction address in an HWA associated with a currently-executing hook instruction for continuing execution of the hooked program containing the hook instruction.

29. An execution method for hook instructions as defined in claim 28, further comprising the step of:

executing the return-from-hook instruction as a last instruction in the analyzer program.

30. An execution method for hook instructions as defined in claim 1, further comprising the steps of:

locating the hook control area in an address space descriptor entry (ASTE) in a table of virtual address space descriptors for an operating system; and specifying in the ASTE entry an address in processor storage for use by a virtual address space containing one or more hooked program(s) and the analyzer program.

31. An execution method for hook instructions as defined in claim 1, further comprising the step of:

saving by the processor executing the hook instruction the contents of a predetermined subset of general registers (GRs) and then loading the GRs respectively with an entry address in the analyzer program, an address of the HWA assigned to the hook instruction, and having one or more GRs usable by the analyzer program; and restoring the saved contents of the GRs by the processor at the end of the analyzer program before execution of the next instruction in the hooked program.

32. An execution method for hook instructions as defined in claim 1, further comprising the steps of:

changing by the analyzer program of an execution state of the hooked program by changing a program status word (PSW) condition code, a program mask, an addressing mode, a return address, an access key for the hooked program, or a control state for an address space associated with the hooked program.

33. An execution method for hook instructions as defined in claim 1, further comprising the step of:

locating an HWA and the analyzer program in each subspace authorized to execute hook instructions within an address space.

34. An execution method for hook instructions as defined in claim 1, further comprising the steps of:

switching tasks on a processor in the data processing system during execution of the analyzer program executing for a first hooked program by interrupting the analyzer program to save its task state;

loading the processor with a task state for another task of a second hooked program; and executing the analyzer program for the second hooked program on the processor before restoring execution of the analyzer program for the first hooked program on the same processor or on another processor in a computer system.

35. An execution method for hook instructions as defined in claim 34, further comprising the steps of:

concurrently-executing the analyzer program for a plurality of hook instructions in a plurality of concurrently-executing hooked programs by switching tasks for different hook instructions in the hooked programs; and task-switching the analyzer program for the different hooked programs in whatever order the hook instructions are executed in the hooked programs.

36. An execution method for enabling a dynamic analysis of a hooked program containing hook instructions by an analyzer program while the hooked program is executing in a production programming environment, as defined in claim 1, the method further including the step of:

locating the analyzer program address in a control area of memory containing controls of the data processing system available only to processor hardware and/or microcode to isolate and protect the analyzer program from all programs executing in the data processing system by not providing the analyzer program address to any program including the hooked program.

37. An execution method for enabling a dynamic analysis of a hooked program containing hook instructions by an analyzer program while the hooked program is executing in a production programming environment, as defined in claim 1, the method further including the step of:

storing an overall enablement indication in controls of the data processing system to enable the hook instructions to execute in the hooked program.

38. An execution method for enabling a dynamic analysis of a hooked program containing hook instructions by an analyzer program while the hooked program is executing in a production programming environment, as defined in claim 1, the hook instruction execution method further including the steps of:

executing small hook instructions inserted at predetermined locations in the hooked program, the small hook instructions each having only an operation code and no operand for minimizing the size of the small hook instructions.

39. An execution method for enabling a dynamic analysis of a hooked program containing hook instructions by an analyzer program while the hooked program is executing in a production programming environment, as defined in claim 18, the hook instruction execution method further including the steps of:

executing a single reentrant read-only analyzer program usable by all hook instructions simultaneously executing on the different processors for the plurality of hooked programs, entering and executing the analyzer program for each executing hook instruction, storing in a processor register an address for locating the HWA assigned to the instant of execution of the hook instruction, and storing in the assigned HWA addresses needed for executing the hook instruction and required for operation of the analyzer program, the analyzer program accessing the register to obtain a location for storing analyzer generated information for the instance of execution of the hook instruction.

40. An execution method for enabling a dynamic analysis of a hooked program containing hook instructions by an analyzer program while the hooked program is executing in a production programming environment, as defined in claim 21, the hook instruction execution method further including the steps of:

executing simultaneously different hook instructions in different hooked programs of a plurality of hooked programs executing simultaneously on different processors in the data processing system, the method further including the following step:

assigning a different one of the plurality of HWAs to a different enabled-executing hook instruction of the different simultaneously-executing hooked programs.

41. An execution method for enabling a dynamic analysis of a hooked program containing hook instructions by an analyzer program while the hooked program is executing in a production programming environment, as defined in claim 40, the hook instruction execution method further including the steps of:

executing a single reentrant read-only analyzer program usable by all hook instructions simultaneously executing on the different processors for the plurality of hooked programs, entering and executing the analyzer program for each executing hook instruction, and storing in processor registers addresses for locating the HWA assigned to the instant of execution of the hook instruction and needed for executing the hook instruction and required for operation of the analyzer program, the analyzer program accessing one of the registers to obtain a location for storing analyzer generated information for the instance of execution of the hook instruction.

\* \* \* \* \*